(12) United States Patent
Akashi et al.

(10) Patent No.: US 11,227,371 B2
(45) Date of Patent: Jan. 18, 2022

(54) IMAGE PROCESSING DEVICE, IMAGE PROCESSING METHOD, AND IMAGE PROCESSING PROGRAM

(71) Applicant: NEC Corporation, Tokyo (JP)

(72) Inventors: Ryuichi Akashi, Tokyo (JP); Masato Toda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 31 days.

(21) Appl. No.: 16/769,747

(22) PCT Filed: Dec. 14, 2017

(86) PCT No.: PCT/JP2017/044853
§ 371 (c)(1),
(2) Date: Jun. 4, 2020

(87) PCT Pub. No.: WO2019/116487
PCT Pub. Date: Jun. 20, 2019

(65) Prior Publication Data
US 2020/0388015 A1    Dec. 10, 2020

(51) Int. Cl.
*G06T 5/50* (2006.01)
*G06T 5/00* (2006.01)

(52) U.S. Cl.
CPC ............. *G06T 5/50* (2013.01); *G06T 5/002* (2013.01); *G06T 2207/20221* (2013.01)

(58) Field of Classification Search
CPC .. G06T 5/002; G06T 5/50; G06T 7/00; G06T 2207/20221; G06K 1/121; G06K 19/06103; G06K 19/06037; G06K 9/00536

See application file for complete search history.

(56) References Cited

U.S. PATENT DOCUMENTS 8,130,278 B2 *   3/2012  Border ................. H04N 1/3876
                                                  348/208.6
8,885,976 B1 *  11/2014  Kuo ........................ G06T 5/008
                                                       382/276

(Continued)

FOREIGN PATENT DOCUMENTS

JP    2000-209432 A    7/2000
JP    2005-537545 A    12/2005

(Continued)

OTHER PUBLICATIONS

Li Tao et al., "A Multi-sensor Image Fusion and Enhancement System for Assisting Drivers in Poor Lighting Conditions", IEEE (Year: 2005).*

(Continued)

*Primary Examiner* — Mekonen T Bekele
(74) *Attorney, Agent, or Firm* — Sughrue Mion, PLLC

(57) ABSTRACT

An image processing device (500) according to the present invention is provided with: a visibility index computation means (501) which, upon receiving two or more images to be merged, computes, for each image to be merged, a visibility index, which is an index relating to the visibility of an object to be viewed in the image, on the basis of a contrast value of the image and the amount of noise included in the image, wherein the two or more images to be merged have different characteristics and have at least an overlap region; a merge ratio computation means (502) which computes an image merge ratio between the images to be merged, on the basis of the computed visibility indices; and an image merging means (503) which merges the images to be merged, on the basis of the computed merge ratio, to generate a merged image.

20 Claims, 16 Drawing Sheets

(56) References Cited

U.S. PATENT DOCUMENTS

| | | | | |
|---|---|---|---|---|
| 2003/0197867 | A1* | 10/2003 | Kwon | G01N 21/538 |
| | | | | 356/437 |
| 2004/0047518 | A1* | 3/2004 | Tiana | G06T 5/50 |
| | | | | 382/284 |
| 2013/0314557 | A1 | 11/2013 | Furukawa | |
| 2015/0078672 | A1* | 3/2015 | Eguro | G01B 11/2513 |
| | | | | 382/224 |
| 2019/0340738 | A1* | 11/2019 | Hartbauer | G06T 5/002 |
| 2020/0090375 | A1* | 3/2020 | Mori | G06F 16/53 |
| 2020/0311505 | A1* | 10/2020 | Kamath | G06K 1/121 |
| 2021/0231457 | A1* | 7/2021 | Neyama | H04W 4/44 |

FOREIGN PATENT DOCUMENTS

| | | | |
|---|---|---|---|
| JP | 2010-166363 A | | 7/2010 |
| JP | 2012-170006 A | | 9/2012 |
| JP | 2014-138329 A | | 7/2014 |
| JP | 2014138329 A | * | 7/2014 |
| JP | 2016-058889 A | | 4/2016 |

OTHER PUBLICATIONS

International Search Report for PCT Application No. PCT/JP2017/044853, dated Mar. 13, 2018.

* cited by examiner

|  | FIRST IMAGE | SECOND IMAGE |
|---|---|---|
| CONTRAST VALUE | 0.59 | 0.49 |
| AMOUNT OF NOISE | 50 | 6 |
| SPATIAL IDENTIFICATION RESOLUTION | 3.25 | 3.03 |

| MERGE RATIO | FIRST IMAGE | SECOND IMAGE |
|---|---|---|
| FIRST SPATIAL FREQUENCY COMPONENT IMAGE (HIGHER FREQUENCY) | 0.3 | 0.7 |
| SECOND SPATIAL FREQUENCY COMPONENT IMAGE | 0.6 | 0.4 |
| THIRD SPATIAL FREQUENCY COMPONENT IMAGE | 0.9 | 0.1 |
| FOURTH SPATIAL FREQUENCY COMPONENT IMAGE (LOWER FREQUENCY) | 1.0 | 0.0 |

IMAGE PROCESSING DEVICE, IMAGE PROCESSING METHOD, AND IMAGE PROCESSING PROGRAM

This application is a National Stage Entry of PCT/JP2017/044853 filed on Dec. 14, 2017, the contents of all of which are incorporated herein by reference, in their entirety.

TECHNICAL FIELD

The present invention relates to an image processing device, an image processing method, and an image processing program for generating a merged image in which two or more images have been merged.

BACKGROUND ART

An image merging technique has been proposed for merging two or more images to generate a merged image that has been improved in visibility. In this image merging technique, a merge ratio is determined for each of the input images serving as merge targets on the basis of a merge index computed from each of the input images, and the input images are merged according to the determined merge ratios, and therefore a merged image is generated.

Examples of a technique for generating a merged image include the techniques described in Patent Literatures (PTLs) 1 and 2. PTL 1 describes an image processing method for performing superimposition or combination processing by using, as a target, a plurality of input images generated by a plurality of sensors, and generating a merged image.

In the image processing method described in PTL 1, first, each of a plurality of images generated by a plurality of sensors is divided into a plurality of image areas. Next, a contrast map including a contrast value for each of the image areas is generated for each of the images. Then, image areas to be used in a merged image are selected on the basis of the contrast value for each of the image areas, and the merged image is formed by using the respective selected image areas. In the method described in PTL 1, when an image area is selected, competitive contrast values (for example, corresponding contrast values of image areas that overlap each other) are compared, and an image area having a larger contrast value is selected.

In addition, PTL 2 describes an image merging method for performing image merging processing while focusing on a spatial frequency component.

In the image processing method described in PTL 2, each of a visible light image and infrared image that have been acquired by image acquisition means is divided, and each of a plurality of predetermined areas that have been acquired due to division in both images is converted into a plurality of spatial frequency components. Next, the spatial frequency components of each of the predetermined areas in both images are combined, and inverse conversion is performed. Then, a pseudo grayscale image (a merged image) is generated by using respective images that have been obtained due to inverse conversion of the plurality of predetermined areas. In the method described in PTL 2, with respect to each of a plurality of predetermined areas, spatial frequency components are combined by selecting a frequency component having a larger lower-frequency component, selecting a larger frequency component, or computing a weighted average.

CITATION LIST

Patent Literature

PTL 1: Japanese National Publication of International Patent Application No. 2005-537545
PTL 2: Japanese Patent Application Laid-Open No. 2010-166363

SUMMARY OF INVENTION

Technical Problem

However, the techniques described in PTLs 1 and 2 have the following problems.

A first problem is that, in a case where an input image includes an image that includes a large amount of noise and has low visibility, a merged image that has been improved in visibility in comparison with an original image before merge fails to be generated.

For example, in the method described in PTL 1, corresponding contrast values of image areas that overlap each other are compared, and a merged image is generated by using an image area having a greater contrast value. However, in such determination of a merge ratio, in a case where an image having a large amount of noise is included in an original image, a great contrast value is computed from the original image. In this case, there is a possibility that a merged image that has not been improved in visibility will be generated as a result of performing merging processing on the original image at a high merge ratio.

Similarly, the method described in PTL 2 has a program in which a merged image that has been improved in visibility in comparison with an original image fails to be generated. In the method described in PTL 2, each of a plurality of predetermined areas into which each of a plurality of images has been divided is converted into spatial frequency components, and with respect to each of the areas, the spatial frequency components are combined by selecting a frequency component having a larger lower-frequency component, selecting a larger frequency component, or computing a weighted average. In such determination of a merge ratio, there is a possibility that a frequency component of noise that results in a reduction in visibility will also be merged. For example, when a frequency component of noise is a low frequency or is large, there is a possibility that an area including such a frequency component of an original image will be determined to have a higher merge ratio, and a merged image that includes a large amount of noise and has low visibility will be generated.

Accordingly, it is an object of the present invention to provide an image processing device, an image processing method, and an image processing program that are capable of stably generating a merged image having high visibility.

Solution to Problem

An image processing device according to the present invention includes: a visibility index computation means which, upon receiving two or more images to be merged, computes, for each image to be merged, a visibility index, which is an index relating to the visibility of an object to be viewed in the image, on the basis of a contrast value of the image and the amount of noise included in the image, wherein the two or more images to be merged have different characteristics and have at least an overlap region; a merge ratio computation means which computes an image merge ratio between the images to be merged, on the basis of the computed visibility indices; and an image merging means which merges the images to be merged, on the basis of the computed merge ratio, to generate a merged image.

In addition, in an image processing method according to the present invention, an information processing device performs: upon receiving two or more images to be merged, computing, for each image to be merged, a visibility index, which is an index relating to the visibility of an object to be viewed in the image, on the basis of a contrast value of the image and the amount of noise included in the image, wherein the two or more images to be merged have different characteristics and have at least an overlap region; computing an image merge ratio between the images to be merged, on the basis of the computed visibility indices; and merging the images to be merged, on the basis of the computed merge ratio, to generate a merged image.

Further, an image processing program according to the present invention causes a computer to perform a process including: upon receiving two or more images to be merged, computing, for each image to be merged, a visibility index, which is an index relating to the visibility of an object to be viewed in the image, on the basis of a contrast value of the image and the amount of noise included in the image, wherein the two or more images to be merged have different characteristics and have at least an overlap region; computing an image merge ratio between the images to be merged, on the basis of the computed visibility indices; and merging the images to be merged, on the basis of the computed merge ratio, to generate a merged image.

Advantageous Effects of Invention

According to the present invention, a merged image having high visibility can be stably generated.

DESCRIPTION OF EMBODIMENTS

First Exemplary Embodiment.

Figure 1:
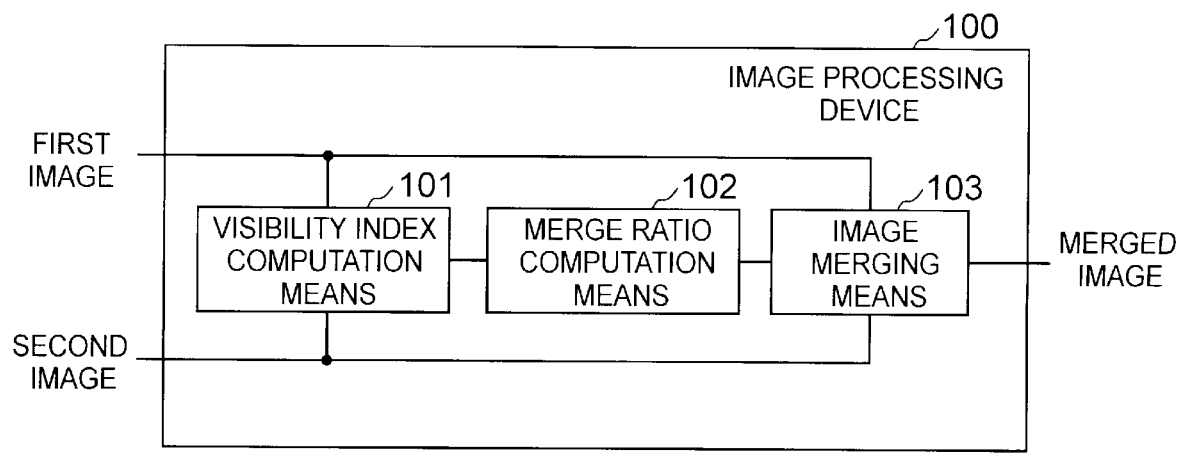
FIG. 1 is a block diagram showing a configuration example of an image processing device according to a first exemplary embodiment.

Exemplary embodiments of the present invention are described below with reference to the drawings. FIG. 1 is a block diagram showing a configuration example of an image processing device according to a first exemplary embodiment of the present invention. An image processing device 100 shown in FIG. 1 includes visibility index computation means 101, merge ratio computation means 102, and image merging means 103.

Here, the image processing device 100 shown in FIG. 1 is an image processing device that outputs a merged image obtained by merging two images (a first image and a second image) at an appropriate merge ratio when the two images are input to the image processing device. The two images have different characteristics and have at least an overlap region. Note that FIG. 1 shows an example where two images are input as images to be merged, but two or more images to be merged may be input.

When the first image and the second image serving as images to be merged are input, the visibility index computation means 101 computes a predetermined visibility index for each of the input images.

Here, the visibility index is an index that indicates the visibility (a degree of easiness of visual recognition) of an object to be viewed that is computed on the basis of a contrast value of an input image serving as a computation target and an amount of noise included in the input image. Note that the object to be viewed is a target (an object or the like) that a predetermined visual recognizer (a person or an object) desires to visually recognize from an image. Note that the number of objects to be viewed is not always one.

The visibility index is not particularly limited, if the visibility index is an index relating to the visibility of an object to be viewed that is computed on the basis of a contrast value and an amount of noise. For example, the visibility index may be an index that is computed by using a power function that uses, as an input, a contrast value and an amount of noise. The visibility index may also be, for example, a spatial identification resolution described later.

The merge ratio computation means 102 computes, for each image (image information), a merge ratio among images to be merged on the basis of visibility indices of the respective images to be merged.

The image merging means 103 merges the respective images to be merged on the basis of the merge ratios of the respective images to be merged, and generates a merged image.

Figure 2:
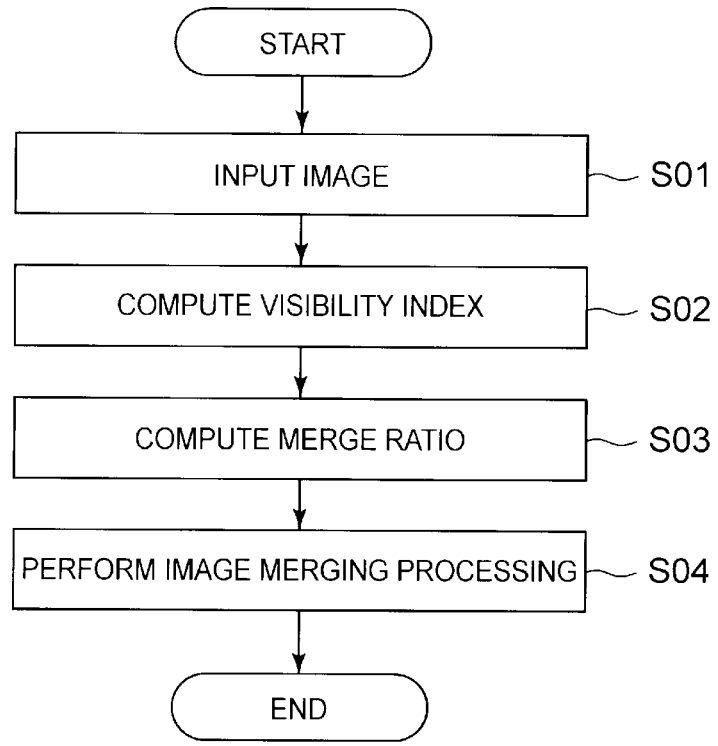
FIG. 2 is a flowchart showing an example of an operation of an image processing device 100.

FIG. 2 is a flowchart showing an example of an operation of the image processing device 100. In the example shown in FIG. 2, first, a first image and a second image that have different characteristics from each other are input as images to be merged to the image processing device 100 (step S01).

When the images to be merged are input, the visibility index computation means 101 computes a visibility index for each of the images to be merged on the basis of a contrast value of each of the images to be merged and an amount of noise included in each of the images to be merged (step S02). The visibility index is an index relating to the visibility of an object to be viewed in each of the images to be merged.

Next, the merge ratio computation means 102 computes a merge ratio among the images to be merged for each of the images to be merged on the basis of the computed visibility index of each of the images to be merged (step S03).

Finally, the image merging means 103 merges the respective images to be merged on the basis of the computed merge ratios of the respective images to be merged, and generates a merged image (step S04).

Figure 3:
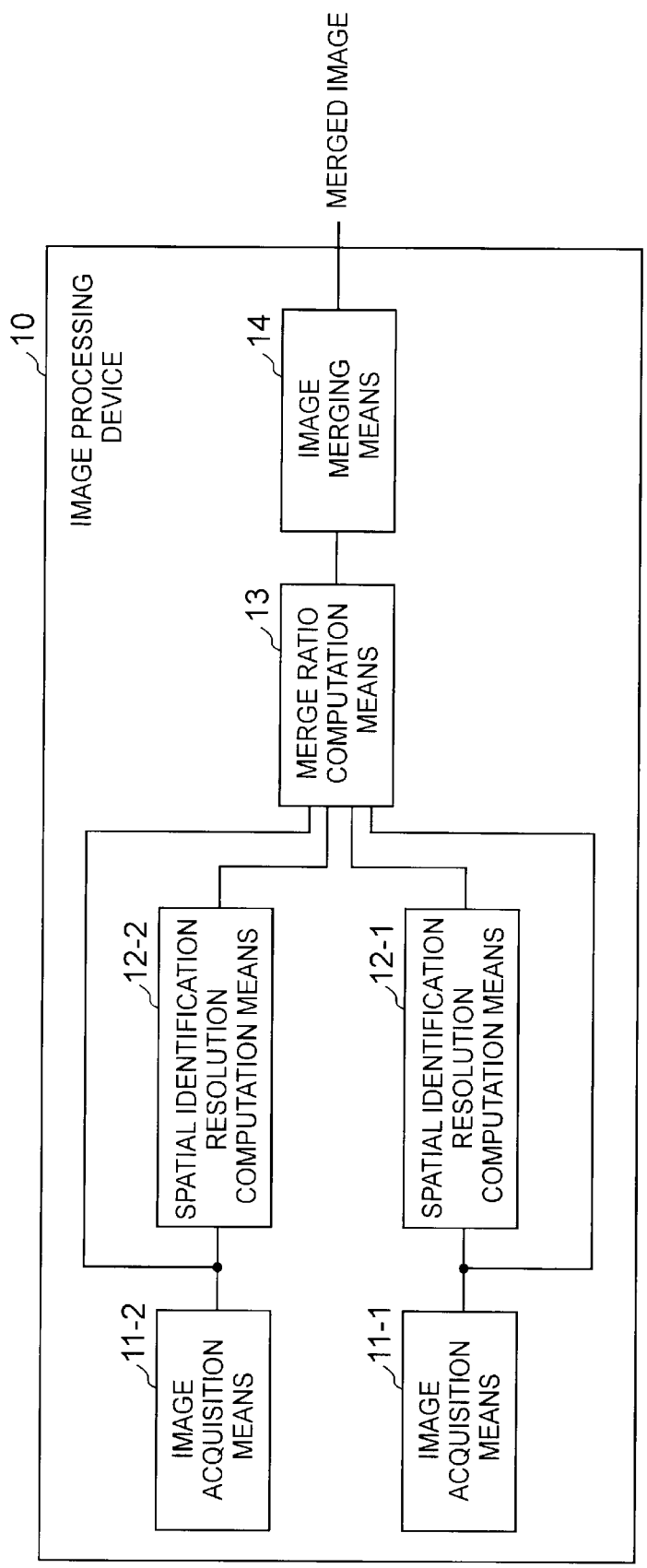
FIG. 3 is a block diagram showing another configuration example of the image processing device according to the first exemplary embodiment.

FIG. 3 is a block diagram showing another configuration example of the image processing device according to the present exemplary embodiment. An image processing device 10 shown in FIG. 3 is a more detailed example of the image processing device 100. The image processing device 10 includes two image acquisition means 11 (11-1 and 11-2), two spatial identification resolution computation means 12 (12-1 and 12-2) that respectively correspond to the image acquisition means 11, merge ratio computation means 13, and image merging means 14.

Note that the spatial identification resolution computation means 12-1 and 12-1 correspond to the visibility index computation means 101, the merge ratio computation means 13 corresponds to the merge ratio computation means 102, and the image merging means 14 corresponds to the image merging means 103.

Hereinafter, the image acquisition means 11-1 may be referred to as a first image acquisition means 11, and the image acquisition means 11-2 may be referred to as a second image acquisition means 11. In addition, an image acquired by the first image acquisition means 11 may be referred to as a first image, and an image acquired by the second image acquisition means 11 may be referred to as a second image. Further, in a case where the first image acquisition means 11 and the second image acquisition means 11 are referred to with no particular distinction, the first image acquisition means 11 and the second image acquisition means 11 may be simply referred to as image acquisition means 11.

The image processing device 10 according to the present exemplary embodiment is a device that acquires the first image and the second image and outputs a merged image obtained by merging these images.

The first image acquisition means 11 acquires image information including a predetermined or arbitrary first area. In addition, the first image acquisition means 11 outputs the acquired image information as image information relating to the first image to post-stage processing means (in the present example, the spatial identification resolution computation means 12-1 and the merge ratio computation means 13). Note that the acquisition of image information includes the acquisition of an image indicated by the image information. However, the acquisition of the image information may not only include the acquisition of the image, but also include the acquisition of other information relating to the image.

The second image acquisition means 11 acquires image information that is different in characteristics from the image information acquired by the first image acquisition means 11 and that relates to a second area including the first area.

The second area for which the second image acquisition means 11 acquires image information may be an area that is the same as or different from an area for which the first image acquisition means 11 acquires image information. However, respective pieces of image information acquired by the two image acquisition means 11 include at least the first area. Note that areas that overlap each other in images of the respective pieces of image information acquired by the two image acquisition means 11 can be regarded as the first area.

In addition, the second image acquisition means 11 outputs the acquired image information as image information relating to the second image to post-stage processing means (in the present example, the spatial identification resolution computation means 12-2 and the merge ratio computation means 13).

Here, a difference in characteristics may be, for example, a difference in an observation wavelength (near infrared light and far infrared light, visible light and infrared light, or the like). As another example, the difference in characteristics may be a difference in observation information (luminance information and distance information (such as depth information), or the like). Note that the above is merely an example, and the difference in characteristics is not limited to the above.

Each of the first image acquisition means 11 and the second image acquisition means 11 may be implemented by an imaging device (an image sensor) or the like that images a predetermined area and acquires image information relating to a captured image, or may be implemented by an input device that inputs the image information described above from external imaging devices, a server device that is connected to the external imaging devices, or the like. This case not only includes an image input device that directly inputs image information from an imaging device, but also includes a network I/O device or the like that inputs image information via a network from a server device or the like in which an imaging device of the imaging device has been stored. As described above, in the first image acquisition means 11 and the second image acquisition means 11, a method for acquiring image information is not particularly limited.

Each of the image acquisition means 11 may output, for example, a captured image (an image itself) as image information, or may output any of or a combination of a contrast value of the captured image, an amount of noise included in the captured image, and various parameters (such as exposure time or a setting value of a gain) at the time of acquisition of the captured image, in addition to the captured image.

In addition, each of the image acquisition means 11 may also output image information to the image merging means 14, but this is not shown. Note that the spatial identification resolution computation means 12 may output image information that the image acquisition means 11 has output to the spatial identification resolution computation means 12, to the merge ratio computation means 13 and the image merging means 14 in a post-stage. Alternatively, the merge ratio computation means 13 that has received image information from the spatial identification resolution computation means 12 can output the image information to the post-stage image merging means 14. Alternatively, by storing image information in a not-shown storage, each means can be caused to freely refer to the image information. As described above, a method for transferring image information in the image processing device 10 is not particularly limited.

In addition, a position of an image capturing source of the first image and a position of an image capturing source of the second image are not particularly limited. However, when the positions of the image capturing sources are separated from each other, a parallax is generated between the first image and the second image, and there is a possibility of a difficulty in image positioning. It is preferable that the image capturing sources of both images be provided in positions that are as close as possible to each other. In a case where the image capturing sources are the first image acquisition means 11 and the second image acquisition means 11, it is sufficient if the first image acquisition means 11 and the second image acquisition means 11 are provided in positions that are as close as possible to each other.

Each of the spatial identification resolution computation means 12-1 and the spatial identification resolution computation means 12-2 uses, as an input, image information acquired by a corresponding image acquisition means 11 (the first image acquisition means 11 or the second image acquisition means 11), and computes a spatial identification resolution from an image (an input image) indicated by the image information.

Here, the spatial identification resolution is an index indicating a minimum object to be viewed size serving as a minimum size of an object to be viewed that can be identified by a predetermined visual recognizer. The visual recognizer is, for example, a person or an object (a device) that visually recognizes a desired object or the like from an image. In addition, the object to be viewed is a target (an object or the like) that the visual recognizer desires to visually recognize from an image. Note that the size is a size (the number of pixels) within an image. In a case where input images have contraction scales different from each other, the size is assumed to be a size within an image after the contraction scales are unified to a contraction scale of any of the input images. Note that the spatial identification resolution is not limited to an index indicating the minimum object to be viewed size itself, and may be, for example, an index that enables the magnitude of the minimum object to be viewed size to be compared among images different from each other (for example, a relative index obtained for an image serving as a comparison target or an image as a reference).

Hereinafter, the spatial identification resolution computation means 12-1 may be referred to as a first spatial identification resolution computation means 12, and the spatial identification resolution computation means 12-2 may be referred to as a second spatial identification resolution computation means 12. In addition, in a case where the first spatial identification resolution computation means 12 and the second spatial identification resolution computation means 12 are referred to with no particular distinction, the first spatial identification resolution computation means 12 and the second spatial identification resolution computation means 12 may be simply referred to as spatial identification resolution computation means 12.

For example, the first spatial identification resolution computation means 12 uses the first image as an input, and outputs a spatial identification resolution for the first image. In addition, for example, the second spatial identification resolution computation means 12 uses the second image as an input, and outputs a spatial identification resolution for the second image. Note that a method for computing a spatial identification resolution in these spatial identification resolution computation means 12 is described later.

In addition, FIG. 3 shows an example where the image processing device 10 includes two image acquisition means and two spatial identification resolution computation means 12 that correspond to two images serving as merge sources. However, the image processing device 10 may include one image acquisition means that acquires two images serving as merge sources or one spatial identification resolution computation means 12 that computes a spatial identification resolution from each of two images.

The merge ratio computation means 13 uses, as an input, the spatial identification resolution for the first image and the spatial identification resolution for the second image, and computes a merge ratio of each of the images in merging processing for merging the first image and the second image.

An example of a method for computing a merge ratio is a method for using a weighted average between a spatial identification resolution computed from the first image and a spatial identification resolution computed from the second image as a merge ratio of each of the images, as expressed as Formula (1).

[Formula 1]

$$R_1 : R_2 = \frac{t_1}{t_1 + t_2} : \frac{t_2}{t_1 + t_2} \quad (1)$$

In this formula, $R_1$ and $R_2$ respectively indicate a merge ratio of the first image and a merge ratio of the second image. In addition, $t_1$ and $t_2$ respectively indicate a spatial identification resolution obtained for the first image and a spatial identification resolution obtained for the second image.

Further, as another example of the method for computing the merge ratio, a method may be used for comparing respective spatial identification resolutions of the first image and the second image and setting a merge ratio of an image having a lower spatial identification resolution to 0, as expressed as Formula (2).

[Formula 2]

$$\begin{cases} R_1 = 1, \ R_2 = 0 \ (\text{if } t_1 > t_2) \\ R_1 = 0, \ R_2 = 1 \ (\text{if } t_1 \leq t_2) \end{cases} \quad (2)$$

The merge ratio computation means 13 compares spatial identification resolutions obtained for respective input images, and sets merge ratios in such a way that at least an image having a higher spatial identification resolution has a higher ratio.

The image merging means 14 uses, as an input, the first image, the second image, and the merge ratios of these images, and generates and outputs a merged image in which the first image and the second image have been merged. Note that a method for generating a merged image (an image merging method) in the image merging means 14 is not particularly limited. For example, merging processing using superimposition or combination of images, as described in PTL 1, may be used, or merging processing in a frequency space, as described in PTL 2, may be used. In these cases, it is assumed that superimposition, combination, or composition of spatial frequency components is performed according to input merge ratios.

Next, a method for computing a spatial identification resolution in the spatial identification resolution computation means 12 is described in more detail.

FIG. 2 is a block diagram showing a configuration example of the spatial identification resolution computation means 12-1. The spatial identification resolution computation means 12-1 shown in FIG. 2 includes contrast computation means 121 and identification resolution computation means 122. Note that the spatial identification resolution computation means 12-1 shown in FIG. 2 uses, an input, an input image including a predetermined area and an amount of noise included in the input image, and outputs a spatial identification resolution that the input image has.

In a case where image information output by each of the image acquisition means 11 includes an amount of noise, it is sufficient if the amount of noise is used. In a case where image information does not include an amount of noise, the amount of noise may be computed on the basis of a (known) noise characteristic of an image capturing source of an input image or another parameter obtained from the image information (exposure time, gain setting, or the like at a time when the image capturing source has captured the input image).

The contrast computation means 121 computes a contrast value of an input image on the basis of the input image.

An example of a method for computing the contrast value in the contrast computation means 121 is a method for computing the contrast value according to Formula (3) by using a maximum value $I_{max}$ and a maximum value $I_{min}$ of luminance values within an image area serving as a target for computation of the contrast value. In Formula (3), C indicates a contrast value.

[Formula 3]

$$C = \frac{I_{max} - I_{min}}{I_{max} + I_{min}} \quad (3)$$

Here, the image area serving as a target for computation of the contrast value is not particularly limited. The image area may be, for example, the entirety of an image, areas that overlap each other in the first image and the second image, or the first area.

In addition, there are a large number of methods for computing the contrast value other than Formula (3), and a method for computing the contrast value that is applicable to the contrast computation means 121 is not limited to the method described above.

The identification resolution computation means 122 computes a spatial identification resolution of an input image on the basis of a contrast value of the input image and an amount of noise of the input image. For example, an amount of noise input to the identification resolution computation means 122 may be obtained together with an input image when a corresponding image acquisition means 11 acquires the input image, or may be estimated from the input image, as described later.

An example of a method for computing a spatial identification resolution in the identification resolution computation means 122 is the following method.

Specifically, the spatial identification resolution is computed by using a method using Function f(ΔC) indicating a relationship between a noise amount change amount ΔN and a contrast value change amount ΔC at a time when an object to be viewed can be identified in an input image, and Function g(ΔS) indicating a relationship between a noise amount change amount ΔN (hereinafter referred to as ΔN' for distinction from the above) and a change amount ΔS of an object to be viewed size at a time when an object to be viewed can be identified in an input image.

Examples of Function f(ΔC) and Function g(ΔS) that are described above are expressed as Formula (4) and Formula (5).

[Formula 4]

$$\Delta N = f(\Delta C) = a*(\Delta C)^b \quad (4)$$

[Formula 5]

$$\Delta N' = g(\Delta S) = c*\log(\Delta S) + d \quad (5)$$

In Formula (4) and Formula (5), a, b, c, and d are predetermined constants. Formula (4) indicates that, when a contrast value of an object to be viewed changes by ΔC, a change amount of an amount of noise that enables the object to be viewed to be identified is ΔN. Formula (5) indicates that, when the size of an object to be viewed changes by ΔS, a change amount of an amount of noise that enables the object to be viewed to be identified is ΔN'.

Formula (6) for estimating a size (a spatial identification resolution) $S_I$ that enables an object to be viewed to be identified can be generated from Formula (4) and Formula (5), by using an amount of noise $N_I$ included in an input image and a contrast value $C_I$ computed from the input image.

[Formula 6]

$$S_I = k*g^{-1}\left(\frac{N_I}{f(C_I)}\right) \quad (6)$$

In this formula, k is a coefficient indicating a scale. $g^{-1}(x)$ is an inverse function of Function g(x). Note that Formula (4), Formula (5), and Formula (6) are examples, and Function f(ΔC), Function g(ΔS), and the spatial identification resolution are not limited to the formulae described above, and it is sufficient if Function f(ΔC), Function g(ΔS), and the spatial identification resolution are, for example, indices based on a contrast value and an amount of noise.

In addition, as a method for computing the spatial identification resolution, a predetermined look-up table may be generated in advance, for example, by computing $S_I$ for a combination of $N_I$ and $C_I$, and the predetermined look-up table may be used as needed.

Figure 5:
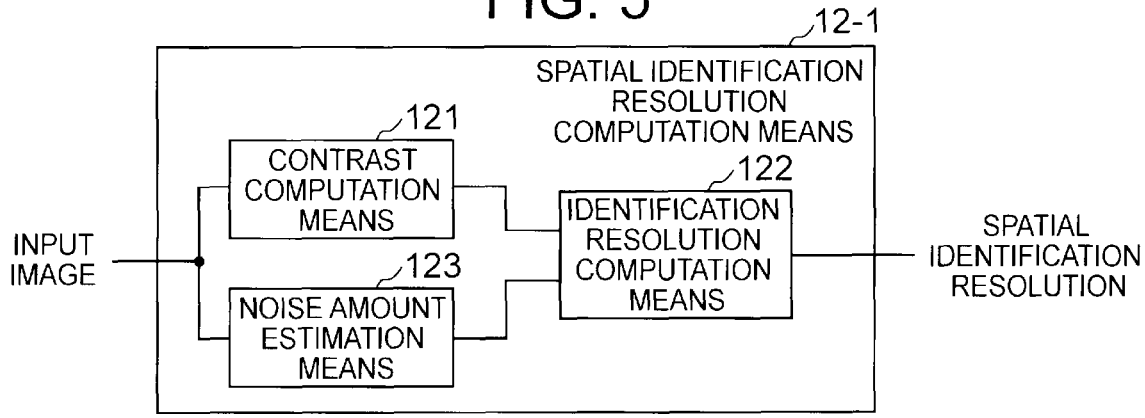
FIG. 5 is a block diagram showing another configuration example of the spatial identification resolution computation means 12-1.

In addition, FIG. 2 shows an example where an input image and an amount of noise $N_I$ of the input noise are input to the spatial identification resolution computation means 12-1, but the spatial identification resolution computation means 12-1 may have, for example, the configuration shown in FIG. 5.

Figure 4:
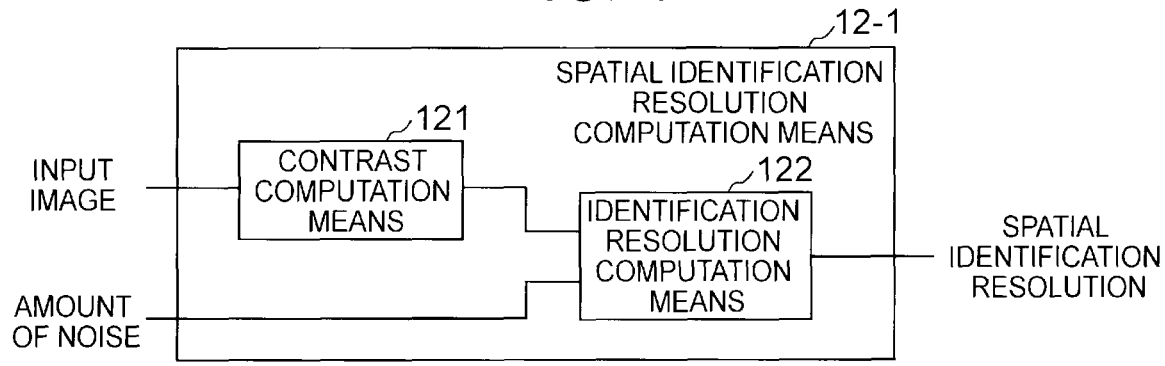
FIG. 4 is a block diagram showing a configuration example of spatial identification resolution computation means 12-1.

FIG. 5 is a block diagram showing another configuration example of the spatial identification resolution computation means 12-1. The spatial identification resolution computation means 12-1 shown in FIG. 5 further includes noise amount estimation means 123 in addition to the configuration shown in FIG. 4.

The noise amount estimation means 123 estimates an amount of noise included in an input image.

An example of a method for estimating an amount of noise in the noise amount estimation means 123 is a method using the variance of a luminance value of a flat area in an image. A method for estimating an amount of noise using the variance of the luminance value is described below.

The noise amount estimation means 123 first divides a target image (an input image) for estimation of an amount of noise into blocks having a size of p×q, and computes variance σ of a luminance value for each of the blocks. Here, p and q are positive integers. Next, the noise amount estimation means 123 regards, as a flat area, a block for which a smallest or X-th smallest variance σ has been computed, determines variance $\sigma_{min}$ computed from the block (the flat area) to be the variance of noise included in the input image, and estimates an amount of noise included in the input image.

More specifically, the noise amount estimation means 123 determines a smallest or X-th smallest value of variance σ to be $\sigma_{min}$. However, X is assumed to be a value that is smaller than the number of blocks for which variance has been obtained. A block having variance that is less than or equal to $\sigma_{min}$ is a block having smaller variance from among all of the blocks in an image, and therefore this block can be regarded as a flat area in the image. Luminance variance in a block in the flat area results from noise, and therefore a maximum value $\sigma_{min}$ of the luminance variance may be estimated as an amount of noise that can be included in the image. Otherwise, a mean value of variance in the flat area can be estimated as an amount of noise.

Note that the method described above for estimating an amount of noise is an example of a noise amount estimation method, and a noise amount estimation method that is applicable to the present invention is not limited to the method described above. In addition, a method for determining a flat area is not limited to the method described above.

Further, the contrast value computation method, the spatial identification resolution computation method, and the noise amount estimation method that are described above have been described by using, as an example, a case where image information is one-dimensional, but the image information (a pixel value) may be multi-dimensional. In a case where the image information is multi-dimensional, it is sufficient if the respective pieces of processing described above are performed on data of each dimension.

Note that specific configuration examples have been described above by using the spatial identification resolution computation means 12-1 as an example. However, another spatial identification resolution computation means 12 may have a similar configuration.

Figure 6:
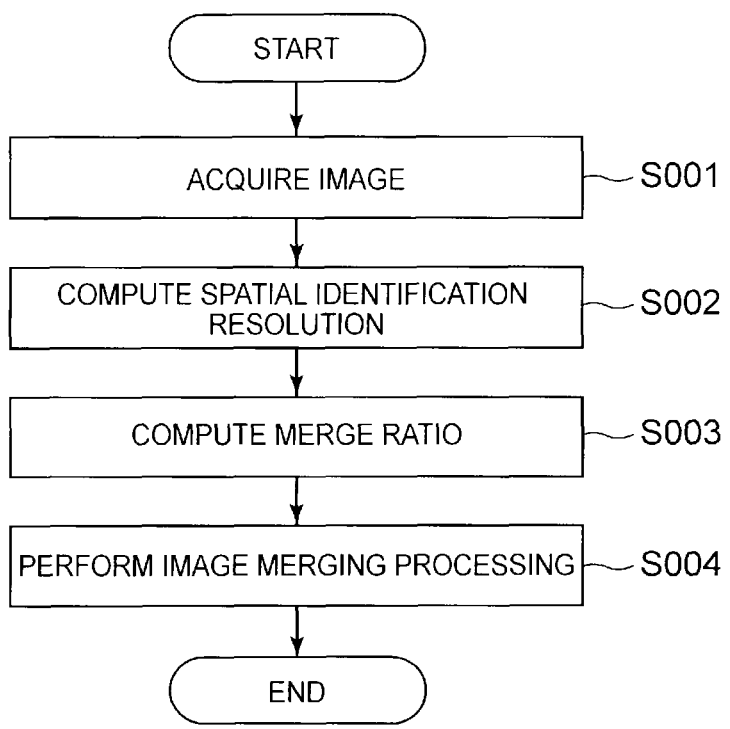
FIG. 6 is a flowchart showing an example of an operation of an image processing device 10 according to the first exemplary embodiment.

Next, an operation according to the present exemplary embodiment is described. FIG. 6 is a flowchart showing an example of an operation of the image processing device 10 according to the present exemplary embodiment. In the example shown in FIG. 6, first, each of the image acquisition means 11 acquires image information relating to a captured image in which an area including the first area has been imaged (step S001). Each of the first image acquisition means 11 and the second image acquisition means 11 may image the area including the first area to generate image information relating to a captured image.

The image information acquired by the first image acquisition means 11 is output as image information relating to the first image to the first spatial identification resolution computation means 12. In addition, the image information acquired by the second image acquisition means 11 is output as image information relating to the second image to the second spatial identification resolution computation means 12.

Next, each of the spatial identification resolution computation means 12 computes a spatial identification resolution of an input image (step S002). Here, the first spatial identification resolution computation means 12 computes a spatial identification resolution from a division image of the first image, and the second spatial identification resolution computation means 12 computes a spatial identification resolution from a division image of the second image. Each of the spatial identification resolution computation means 12 computes, for example, a contrast value for the input image, and computes a spatial identification resolution for the input image from the computed contrast value and an amount of noise included in the input image.

Next, the merge ratio computation means 13 computes a merge ratio of each of the input images in a merged image on the basis of the spatial identification resolutions computed for the input images (the first image and the second image) (step S003). The merge ratio computation means 13 computes the merge ratio, for example, in such a way that an input image having a higher spatial identification resolution has a higher merge ratio.

Next, the image merging means 14 merges the input images (the first image and the second image) at the merge ratios computed by the merge ratio computation means 13, and generates a merged image (step S004).

As described above, according to the present exemplary embodiment, by determining a merge ratio by using a spatial identification resolution as an index, setting can be performed in such a way that, from among input images, an image in which more spatially detailed information relating to an object to be viewed can be visually recognized has a higher merge ratio. Therefore, even in a case where an original image includes noise, a merged image having high visibility can be stably generated.

For example, in a case where a merge ratio is determined on the basis of only a contrast value, there is a possibility that an input image including a large amount of noise will have a higher merge ratio. In contrast, according to the present exemplary embodiment, the merge ratio is determined on the basis of a spatial identification resolution computed in consideration of both the contrast value and an amount of noise. Therefore, priority can be given to an input image in which an object to be viewed can be identified more clearly, and the input image can be merged at a higher ratio.

Second Exemplary Embodiment

Figure 7:
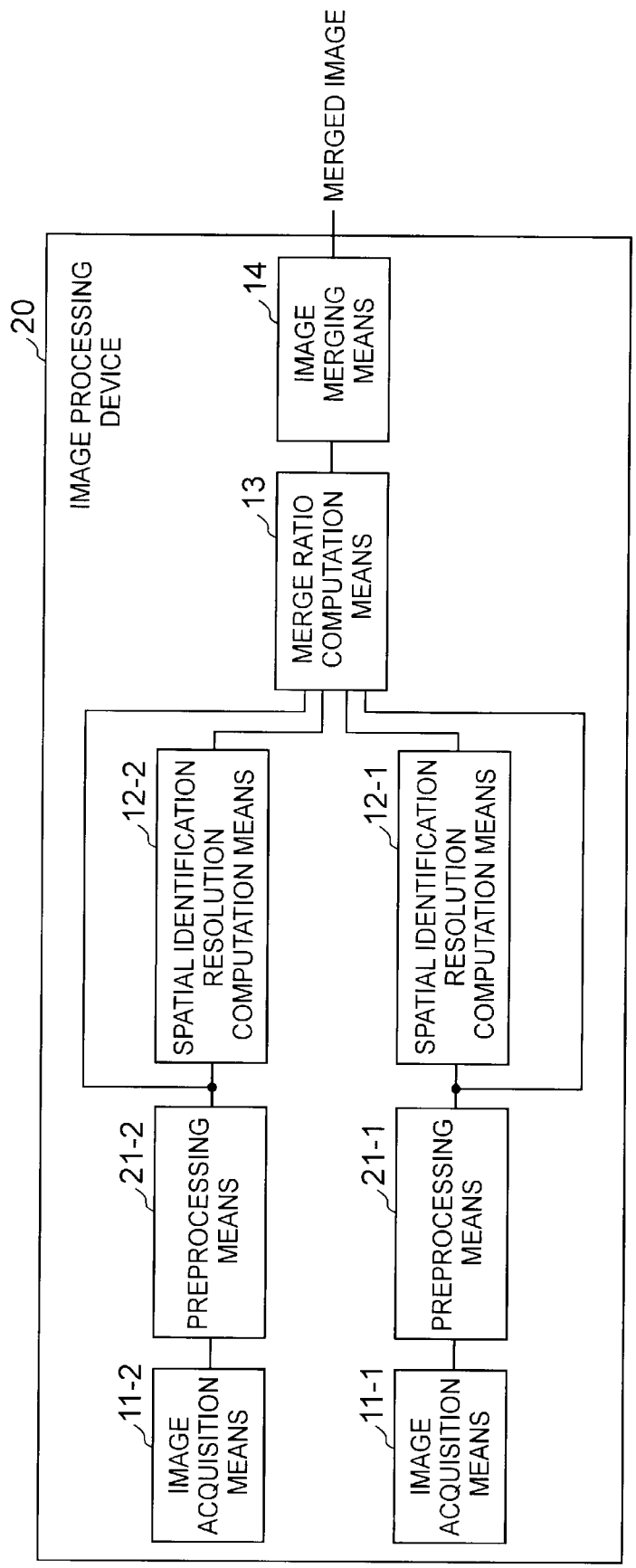
FIG. 7 is a block diagram showing a configuration example of an image processing device according to a second exemplary embodiment.

Next, a second exemplary embodiment of the present invention is described with reference to FIG. 7. FIG. 7 is a block diagram showing a configuration example of an image processing device according to the second exemplary embodiment. An image processing device 20 shown in FIG. 7 is different from the image processing device 10 according to the first exemplary embodiment shown in FIG. 3 in that preprocessing means 21 (preprocessing means 21-1 and preprocessing means 21-2) are added.

Hereinafter, the preprocessing means 21-1 may be referred to as a first preprocessing means 21, and the preprocessing means 21-2 may be referred to as a second preprocessing means 21. In addition, in a case where the first preprocessing means 21 and the second preprocessing means 21 are referred to with no particular distinction, the first preprocessing means 21 and the second preprocessing means 21 may be simply referred to as preprocessing means 21.

The preprocessing means 21 in the present example is provided in a post-stage of the image acquisition means 11 and in a pre-stage of the spatial identification resolution computation means 12. Accordingly, for example, the first image acquisition means 11 outputs image information relating to the first image to the first preprocessing means 21. In addition, for example, the second image acquisition means 11 outputs image information relating to the second image to the second preprocessing means 21.

Each of the preprocessing means 21 performs preprocessing on an image (an input image) indicated by image information that has been input from the image acquisition means 11. In addition, each of the preprocessing means 21 outputs image information after preprocessing to the spatial identification resolution computation means 12, the merge ratio computation means 13, or the image merging means 14 in a post-stage.

Examples of preprocessing include noise suppression processing, contrast emphasis processing, image sharpening processing, and the like. The preprocessing means 21 may only perform any of these pieces of processing, or may perform a combination of a plurality of pieces of processing from among these pieces of processing. Note that the preprocessing means 21 can perform preprocessing other than the pieces described above of processing.

The spatial identification resolution computation means 12, the merge ratio computation means 13, and the image merging means 14 use an image after preprocessing as an input image, and perform the computation of a spatial identification resolution, the computation of a merge ratio, and merging processing on the image after preprocessing.

Figure 8:
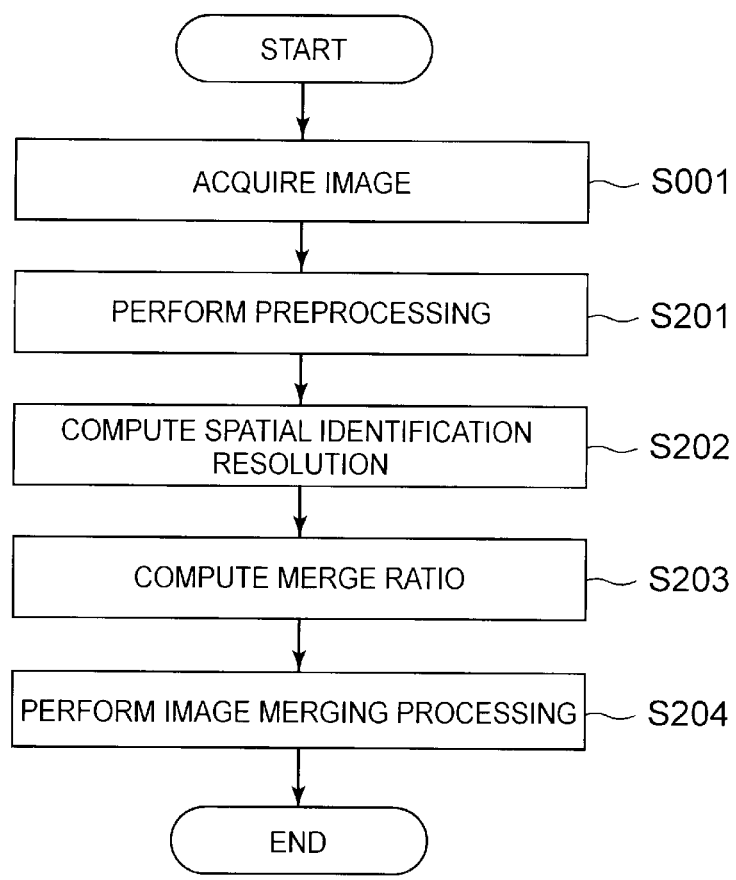
FIG. 8 is a flowchart showing an example of an operation of an image processing device 20 according to the second exemplary embodiment.

Next, an operation according to the second exemplary embodiment is described. FIG. 8 is a flowchart showing an example of an operation of the image processing device 20 according to the second exemplary embodiment.

As shown in FIG. 8, in the present exemplary embodiment, after the image acquisition means 11 has performed processing for acquiring image information (step S001), each of the preprocessing means 21 performs preprocessing on an input image (step S201). Here, the first preprocessing means 21 performs preprocessing on the first image, and the second preprocessing means 21 performs preprocessing on the second image. Then, each of the preprocessing means 21 outputs image information relating to an image after preprocessing to the spatial identification resolution computation means 12 in the post-stage.

When the image information relating to the image after preprocessing is input to each of the spatial identification resolution computation means 12, each of the spatial identification resolution computation means 12 computes a spatial identification resolution for the image after preprocessing that is indicated by the image information (step S202).

Here, the first spatial identification resolution computation means 12 computes a spatial identification resolution from an image after preprocessing of the first image, and the second spatial identification resolution computation means 12 computes a spatial identification resolution from an image after preprocessing of the second image.

For example, in a case where preprocessing is image emphasis processing such as image sharpening processing, the spatial identification resolution computation means 12 may newly compute a contrast value from an image after preprocessing (an emphasized image), and may compute a spatial identification resolution on the basis of the computed contrast value and an amount of noise included in the emphasized image. At this time, as the amount of noise included in the emphasized image, an amount of noise included in image information relating to an initial input image may be used, or an amount of noise estimated from the emphasized image can be used. In a case where preprocessing is noise suppression processing, it is more preferable that an amount of noise be estimated from an image after preprocessing (a noise-suppressed image).

Next, the merge ratio computation means 13 computes merge ratios of an image after preprocessing of the first image and an image after preprocessing of the second image in a merged image on the basis of spatial identification resolutions that the first spatial identification resolution computation means 12 and the second spatial identification resolution computation means 12 have computed for the image after preprocessing of the first image and the image after preprocessing of the second image (step S203).

Next, the image merging means 14 merges the image after preprocessing of the first image and the image after preprocessing of the second image at the merge ratios computed by the merge ratio computation means 13, and generates a merged image (step S204).

The operations of step S202 to step S204 are basically similar to the operations of step S002 to step S004 according to the first exemplary embodiment, excluding the use of an image after preprocessing as an input image.

As described above, according to the present exemplary embodiment, an appropriate merge ratio can be determined on the basis of a spatial identification resolution, with respect to an image on which image processing has been performed as preprocessing in addition to a general captured image. Therefore, a merged image having high visibility can be stably generated.

Further, by performing preprocessing in the image processing device 20, even in a case where an input image includes a large amount of noise, a spatial identification resolution can be computed in consideration of a change in a true observation value (such as a luminance value) rather than noise. Therefore, a merged image having high visibility can be stably generated.

For example, in some cases, a true luminance value rather than noise has been observed by an image capturing device, but an input image includes a large amount of noise. In such cases, a spatial identification resolution computed from the input image has a value that is equal to a value computed from an image having no contrast. In such cases, preprocessing is performed to, for example, suppress noise or emphasize a contrast, and a contrast value or an amount of noise is obtained for an image after preprocessing. Therefore, a spatial identification resolution can be computed in consideration of a change in luminance that can be observed by the image capturing device. Note that such an effect of the removal of an influence of noise, or the like is similarly exhibited in the case of an observation value other than a luminance value.

Third Exemplary Embodiment

Figure 9:
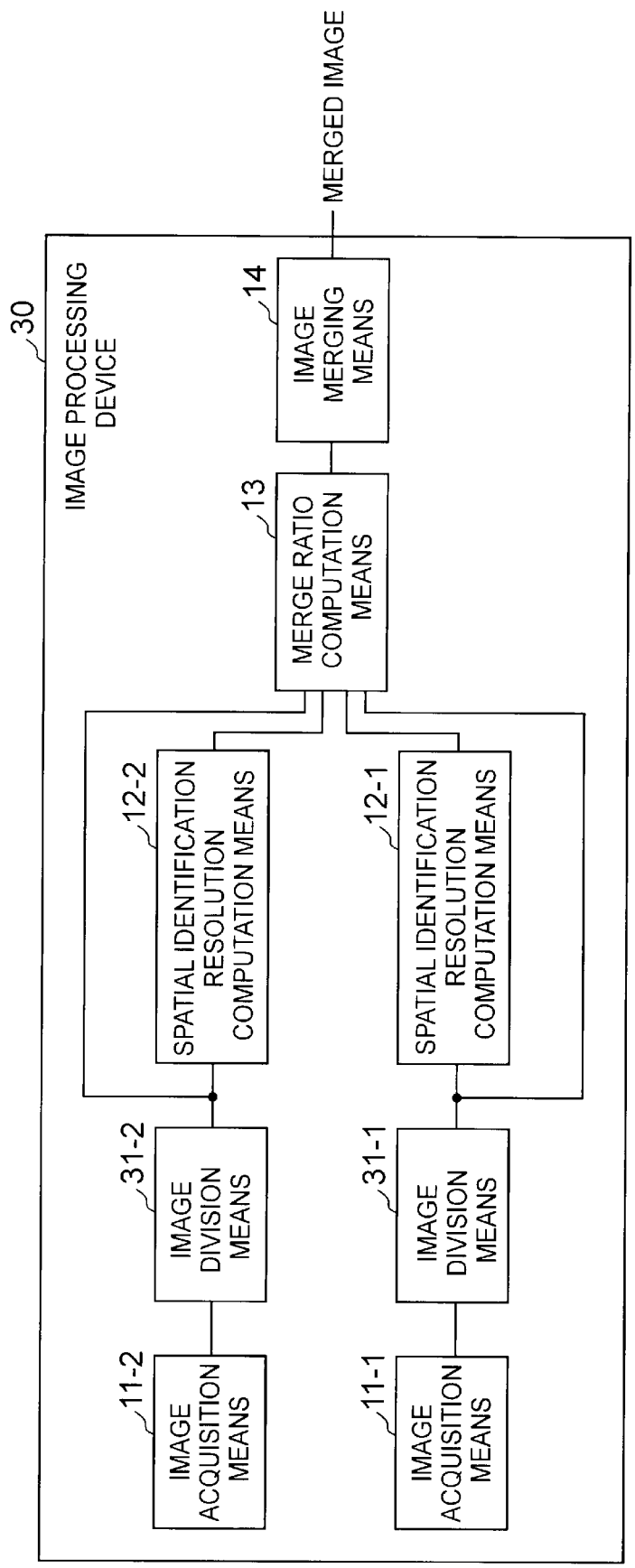
FIG. 9 is a block diagram showing a configuration example of an image processing device according to a third exemplary embodiment.

Next, a third exemplary embodiment of the present invention is described with reference to FIG. 9. FIG. 9 is a block diagram showing a configuration example of an image processing device according to the third exemplary embodiment. An image processing device 30 shown in FIG. 9 is different from the image processing device 10 according to the first exemplary embodiment shown in FIG. 3 in that image division means 31 (image division means 31-1 and image division means 31-2) are added.

The image processing device 30 according to the present exemplary embodiment divides an input image by using the image division means 31, computes a spatial identification resolution and a merge ratio for each of the image areas after division (the division areas), performs image merging processing on each of the division areas according to the computed merge ratio, and generates a merged image.

Hereinafter, the image division means 31-1 may be referred to as a first image division means 31, and the image division means 31-2 may be referred to as a second image division means 31. In addition, in a case where the first image division means 31 and the second image division means 31 are referred to with no particular distinction, the first image division means 31 and the second image division means 31 may be simply referred to as image division means 31.

The image division means 31 in the present example is provided in a post-stage of the image acquisition means 11 and in a pre-stage of the spatial identification resolution computation means 12. Accordingly, for example, the first image acquisition means 11 outputs image information relating to the first image to the first image division means 31. In addition, for example, the second image acquisition means 11 outputs image information relating to the second image to the second image division means 31.

Each of the image division means 31 divides an image (an input image) indicated by image information that has been input from the image acquisition means 11 into a plurality of areas. Hereinafter, a partial image of an area after division (a division area) may be referred to as a division image. The division image may be a partial image of a block area that is configured by a single pixel or a plurality of pixels, or may be a partial image of an area that has an arbitrary shape and is configured by a plurality of pixels.

However, each of the image division means 31 employs the same division method at least in the first areas of input images. Stated another way, a division method employed in the first area included in the first image is caused to match a division method employed in the first area included in the second image. In other words, the first image and the second image are divided in such a way that division images obtained by dividing the first area included in the first image and division images obtained by dividing the first area included in the second image are partial images in which respective identical areas have been imaged.

In addition, each of the image division means 31 outputs image information relating to each of the division images after division to the spatial identification resolution computation means 12, the merge ratio computation means 13, or the image merging means 14 in a post-stage.

The spatial identification resolution computation means 12, the merge ratio computation means 13, and the image merging means 14 use each of the division images after division as an input image, and perform the computation of a spatial identification resolution, the computation of a merge ratio, and merging processing in each of the division areas.

When a spatial identification resolution is computed, image information relating to an area other than a division area serving as a computation target may be referred to. For example, when a contrast is computed or when a flat area or variance is obtained in order to estimate an amount of noise, information relating to the entirety of an input image before division or information relating to an adjacent division image can be referred to.

In addition, the merge ratio computation means 13 according to the present exemplary embodiment computes, for each of the division areas, merge ratios of a division image of the first image and a division image of the second image on the basis of a spatial identification resolution of the division image of the first image and a spatial identification resolution of the division image of the second image that have been computed for each of the division areas. Here, with respect to a division area for which only either a division image of the first image or a division image of the second image is present, such as an area in which the first image and the second image do not include the same image capturing area, it is sufficient if a merge ratio is set to 1 (100%).

In addition, the image merging means 14 according to the present exemplary embodiment generates a merged image (a division merge image) for each of the division areas, integrates the generated division merge images, and generates a merged image. The image merging means may use, as an input, a division image of the first image, a division image of the second image, and a merge ratio computed from each of the division images for each of the division areas, may merge the division image of the first image and the division image of the second image at the input merge ratios, and may generate a division merge image. When a division merge image has been generated in all of the division areas, these merge division images are integrated, and a merged image is generated. At this time, a merged image may be generated by only using areas of either the first image or the second image as a target, or a merged image may be generated by only using the first area as a target.

Figure 10:
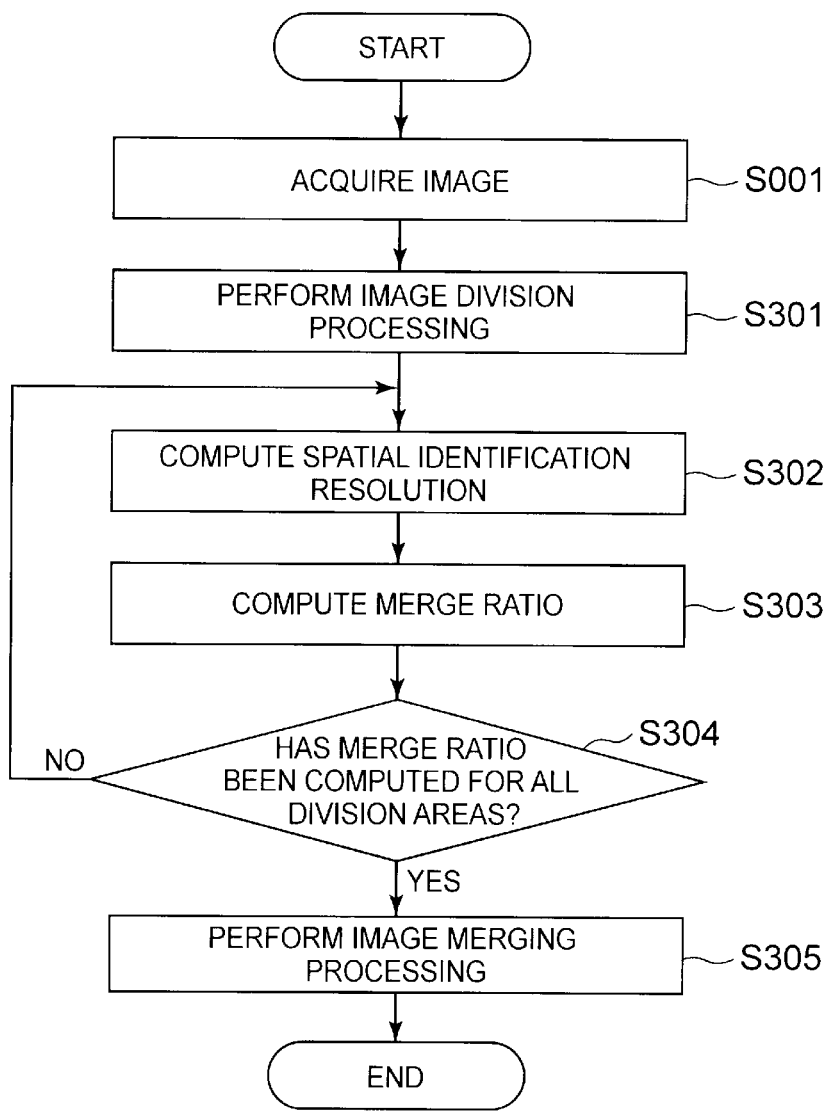
FIG. 10 is a flowchart showing an example of an operation of an image processing device 30 according to the third exemplary embodiment.

Next, an operation according to the third exemplary embodiment is described. FIG. 10 is a flowchart showing an example of an operation of the image processing device 30 according to the third exemplary embodiment.

As shown in FIG. 10, in the present exemplary embodiment, after the image acquisition means 11 has performed processing for acquiring image information (step S001), the image division means 31 divides an input image (step S301). Here, the first image division means 31 divides the first image, and the second image division means 31 divides the second image. Then, each of the image division means 31 sequentially outputs pieces of image information relating to division images obtained due to division to the spatial identification resolution computation means 12 in the post-stage. Image information relating to a division image may include information relating to division size, a position in an image before division, or the like.

When the image information relating to the division image is input to the spatial identification resolution computation means 12, the spatial identification resolution computation means 12 computes a spatial identification resolution for the division image indicated by the image information (step S302). Here, the first spatial identification resolution computation means 12 computes a spatial identification resolution from a division image of the first image, and the second spatial identification resolution computation means 12 computes a spatial identification resolution from a division image of the second image.

Next, the merge ratio computation means 13 computes merge ratios of a division image of the first image and a division image of the second image in a merged image on the basis of spatial identification resolutions that the first spatial identification resolution computation means 12 and the second spatial identification resolution computation means 12 have computed for the division image of the first image and the division image of the second image (step S303).

In step S304, it is determined whether merge ratio computation processing (step S303) has been completed for all of the division areas (the division images). In a case where merge ratio computation processing has not been completed for all of the division images (No in step S304), the processing returns to step S302, and spatial identification resolution computation processing (step S302) and merge ratio computation processing (S303) are performed on a division image of the first image and a division image of the second image that correspond to a division area for which a merge ratio has not yet been computed.

In contrast, in a case where merge ratio computation processing has been completed for all of the division images (Yes in step S304), the processing moves on to step S305.

In step S305, the image merging means 14 merges, for each of the division area, division images in accordance with the computed merge ratios of the respective division images (a division image of the first image and a division image of the second image that correspond to each of the division areas), integrates the obtained division merge images, and generates a final merged image.

As described above, according to the present exemplary embodiment, an image is divided, and a spatial identification resolution is computed and a merge ratio is computed for each of the division areas, and therefore an appropriate merge ratio can be obtained for each of the division areas. Thus, a merged image having high visibility can be stably obtained in all of the division areas.

Fourth Exemplary Embodiment

Figure 11:
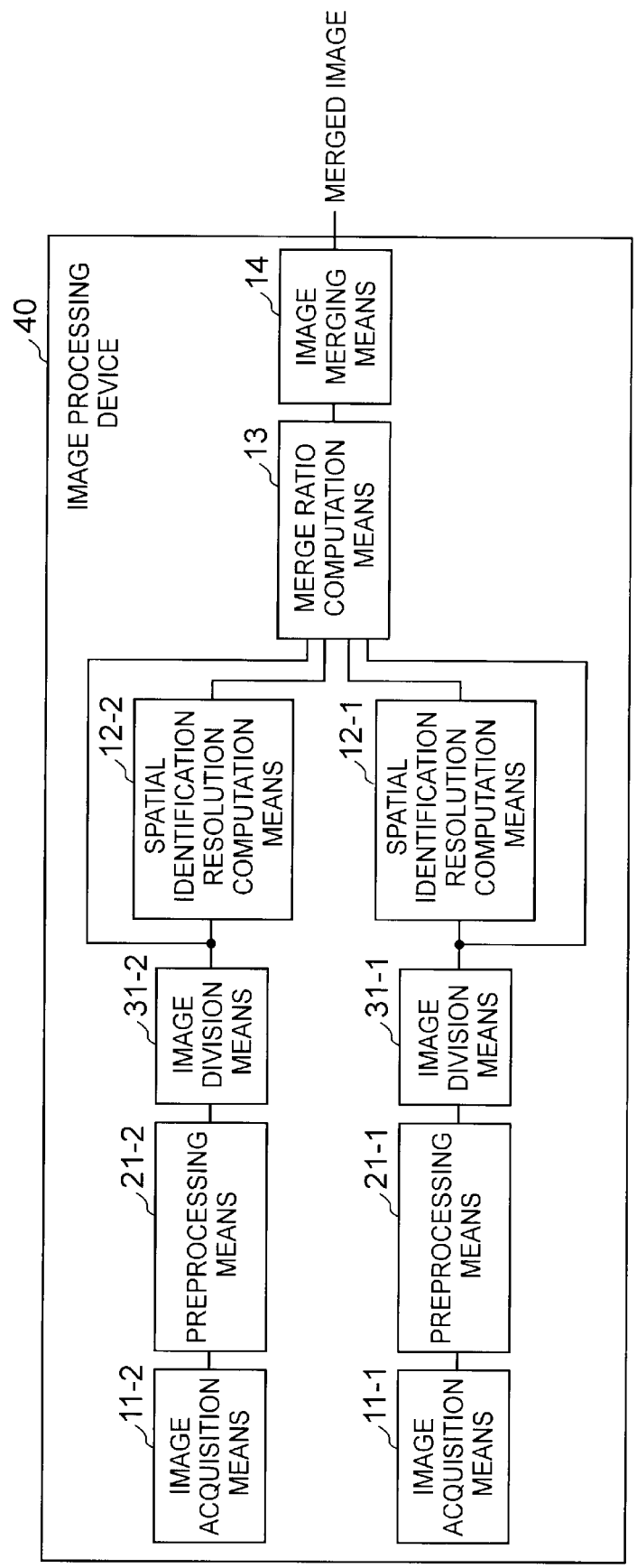
FIG. 11 is a block diagram showing a configuration example of an image processing device according to a fourth exemplary embodiment.

Next, a fourth exemplary embodiment of the present invention is described with reference to FIG. 11. FIG. 11 is a block diagram showing a configuration example of an image processing device according to the fourth exemplary embodiment. An image processing device 40 shown in FIG. 11 has a combination of a configuration according to the second exemplary embodiment and a configuration according to the third exemplary embodiment. Stated another way, the preprocessing means 21 (the preprocessing means 21-1 and the preprocessing means 21-2) and the image division means 31 (the image division means 31-1 and the image division means 31-2) are added to a configuration of the image processing device 10 according to the first exemplary embodiment that is shown in FIG. 1.

In the present example, the preprocessing means 21 and the image division means 31 are provided in this order between the image acquisition means 11 and the spatial identification resolution computation means 12. Stated another way, the preprocessing means 21 is provided in a post-stage of the image acquisition means 11, the image division means 31 is provided in a post-stage of the preprocessing means 21, and the spatial identification resolution computation means 12 is provided in a post-stage of the image division means 31.

In the image processing device 40 according to the present exemplary embodiment, the preprocessing means 21 performs preprocessing on an input image, and the image division means 31 divides an image after preprocessing. Note that each of the division images after division is handled similarly to the third exemplary embodiment.

Figure 12:
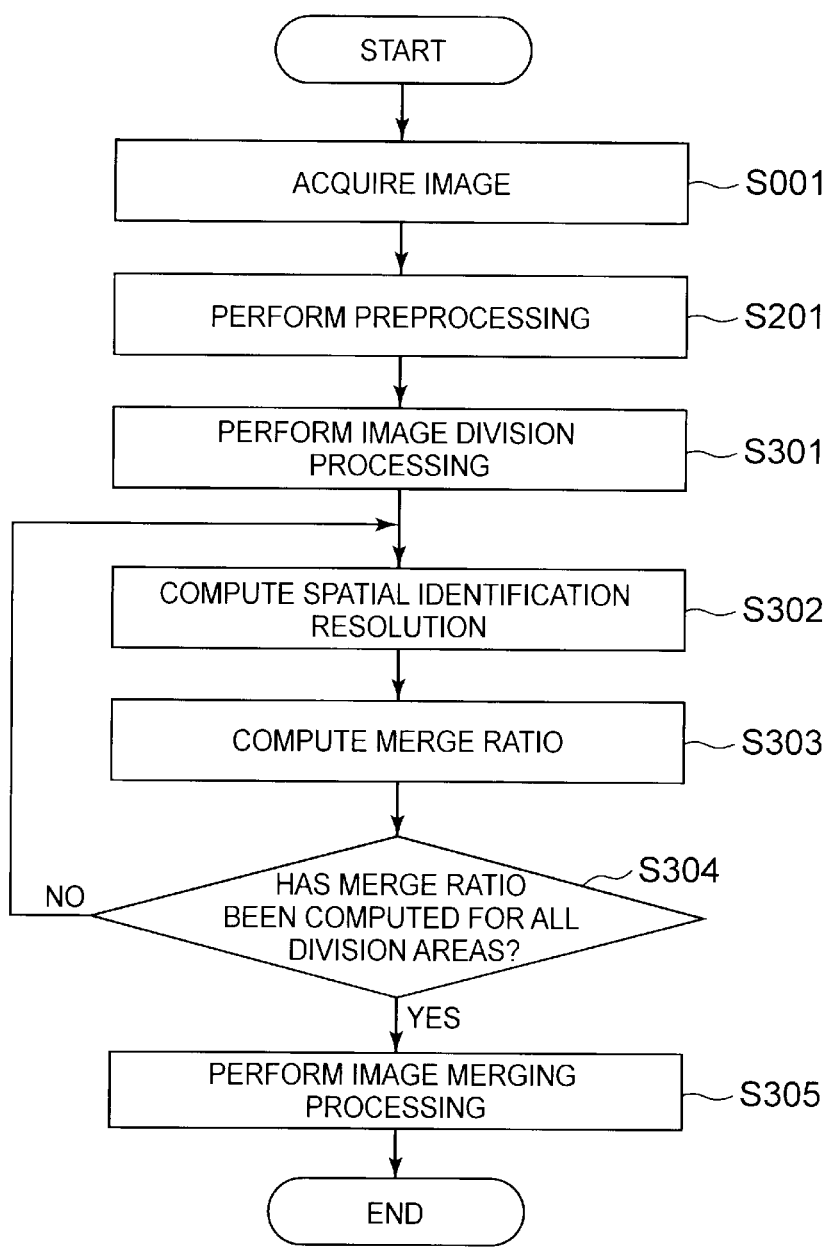
FIG. 12 is a flowchart showing an example of an operation of an image processing device 30 according to the fourth exemplary embodiment.

Next, an operation according to the fourth exemplary embodiment is described. FIG. 12 is a flowchart showing an example of an operation of the image processing device 40 according to the fourth exemplary embodiment. Note that operations that are similar to operations in the first to third exemplary embodiments are denoted by the same reference signs.

As shown in FIG. 12, in the present exemplary embodiment, after the image acquisition means 11 has performed processing for acquiring image information (step S001), each of the preprocessing means 21 performs preprocessing on an input image (step S201). Then, image information relating to an image after preprocessing is output to the image division means 31 in a post-stage.

Next, the image division means 31 divides the image after preprocessing that serves as an input image (step S301). Here, the first image division means 31 divides an image after preprocessing of the first image, and the second image division means 31 divides an image after preprocessing of the second image.

The processing that follows is similar to processing according to the third exemplary embodiment excluding the replacement of a division image with a division image of an image after preprocessing.

As described above, according to the present exemplary embodiment, image division is performed after preprocessing is performed on an input image. Therefore, even in a case where an input image includes a large amount of noise, a merged image having high visibility can be stably obtained in all of the division areas.

Fifth Exemplary Embodiment

Figure 13:
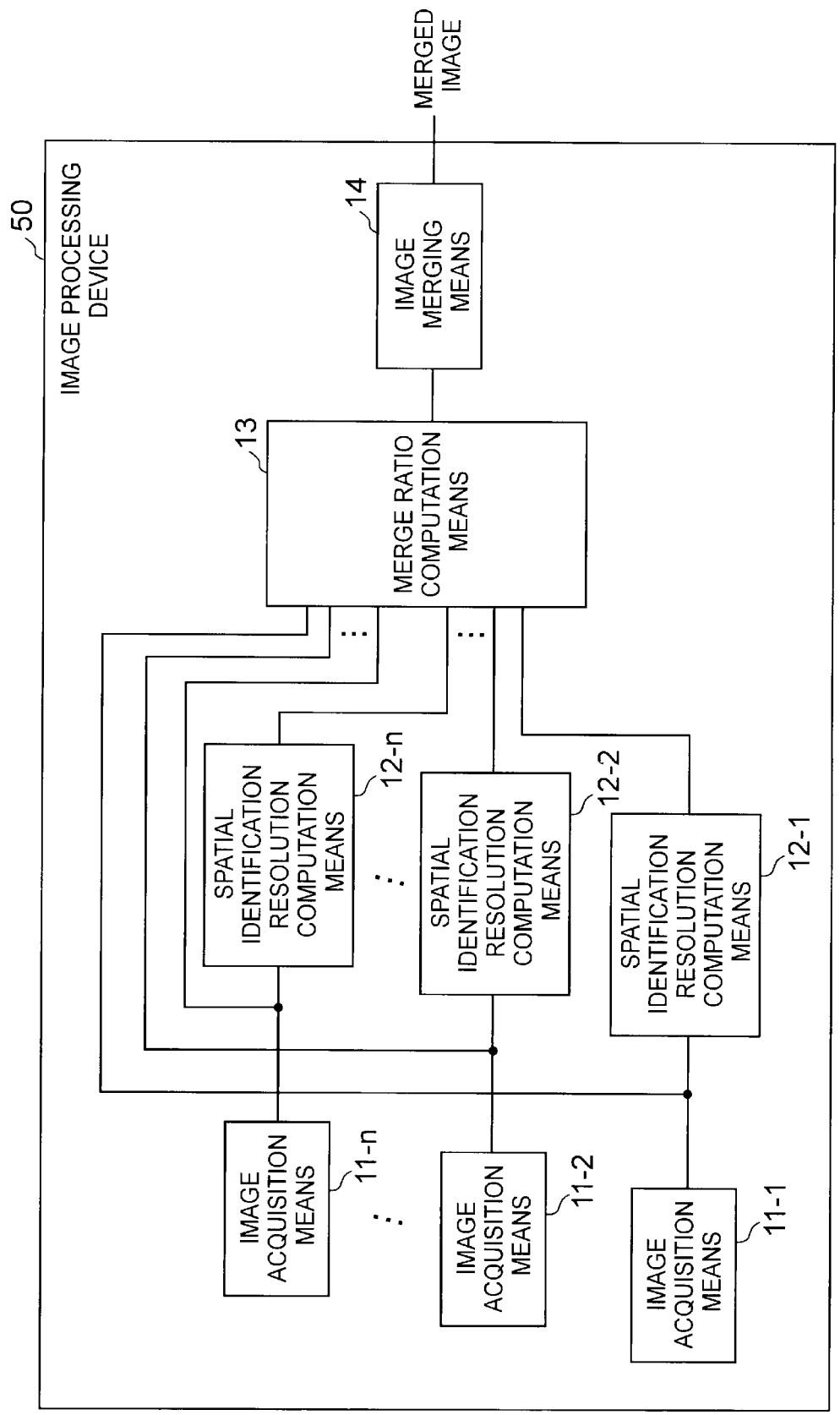
FIG. 13 is a block diagram showing a configuration example of an image processing device according to a fifth exemplary embodiment.

In the first to fourth exemplary embodiments described above, a case where two image are merged has been described. However, two or more images may be merged. FIG. 13 is a block diagram showing a configuration example of an image processing device according to a fifth exemplary embodiment. An image processing device 50 shown in FIG. 13 is an example where three or more image acquisition means 11 (image acquisition means 11-1 to 11-$n$) and corresponding spatial identification resolution computation means 12 (spatial identification resolution computation means 12-1 to 12-$n$) are included. Note that the present exemplary embodiment indicates an example where three or more input images are used in the first exemplary embodiment. An operation according to the present exemplary embodiment is basically similar to an operation according to the first exemplary embodiment excluding the use of three or more input images.

Even in the case of three or more input images, each of the input images includes at least an area that is identical to an area included in at least one of the other input images (this area corresponds to the first area described above). Note that a single identical area does not need to be included in all of the input images. Stated another way, it is sufficient if each of the input images includes an area that is only identical to an area included in any one of the other input images. For example, an area that is identical between a first image and a second image may be different from an area that is identical between the second image and a third image. In this case, it is sufficient if the merge ratio computation means 13 computes a merge ratio of an identical area between images including the identical area.

In a case where a merge ratio is determined by using three or more images as a target, the merge ratio is determined in such a way that an image having a higher spatial identification resolution has a higher ratio. This includes a case where an image having a highest spatial identification resolution has a highest ratio and an image having a lowest spatial identification resolution has a lowest ratio. Examples include a case where a ratio of the height of a spatial identification resolution is determined with no change as a merge ratio of each of the input images and a case where a ratio of a weight based on the height of the spatial identification resolution is determined as the merge ratio of each of the input images.

Sixth Exemplary Embodiment

Figure 14:
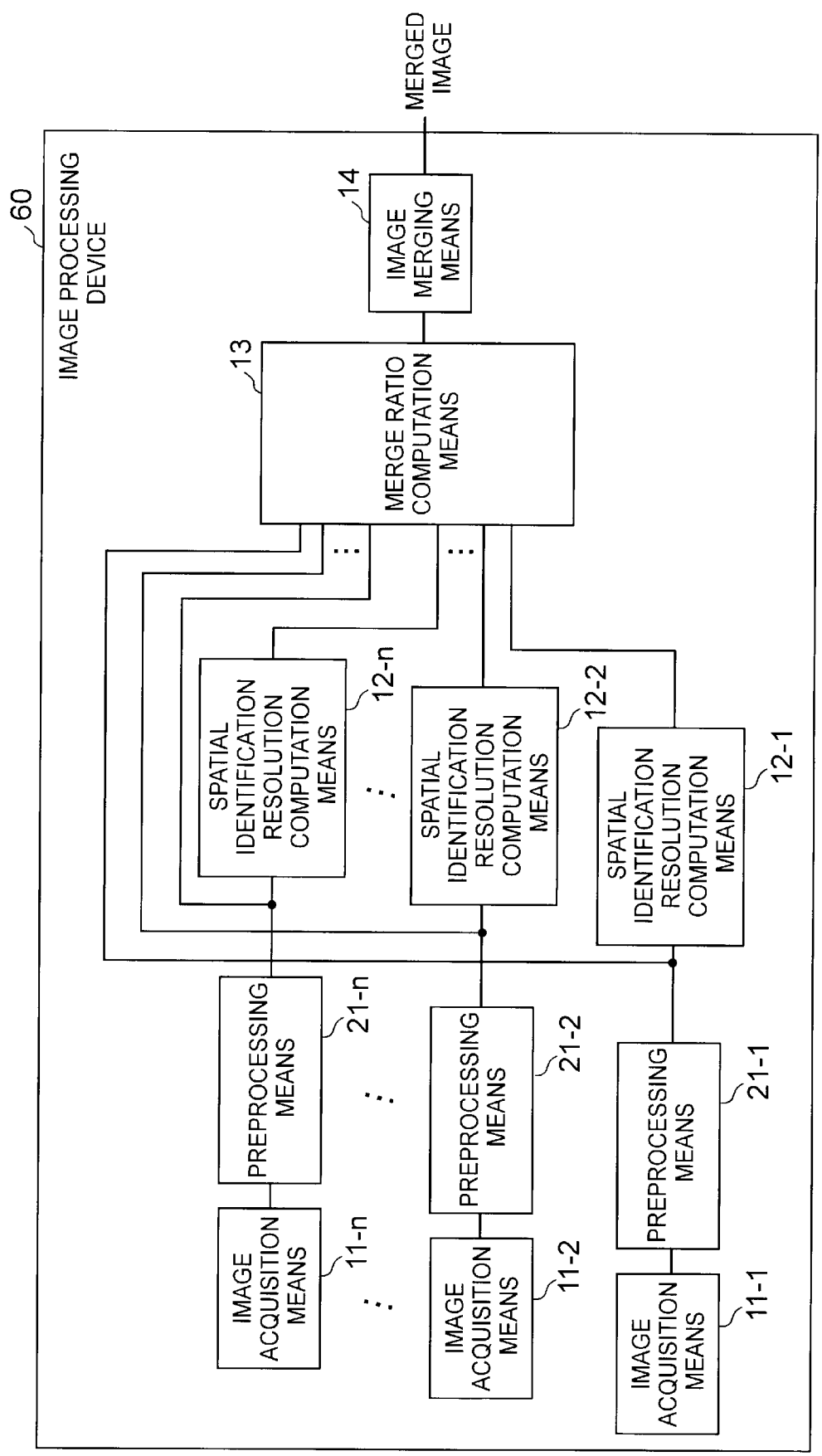
FIG. 14 is a block diagram showing a configuration example of an image processing device according to a sixth exemplary embodiment.

FIG. 14 is a block diagram showing a configuration example of an image processing device according to a sixth exemplary embodiment. In an image processing device 60 shown in FIG. 14, three or more preprocessing means 21 (preprocessing means 21-1 to preprocessing means 21-*n*) are further added to a configuration according to the fifth exemplary embodiment. Note that the present exemplary embodiment indicates an example where three or more input images are used in the second exemplary embodiment. An operation according to the present exemplary embodiment is basically similar to an operation according to the second exemplary embodiment excluding the use of three or more input images.

Seventh Exemplary Embodiment

Figure 15:
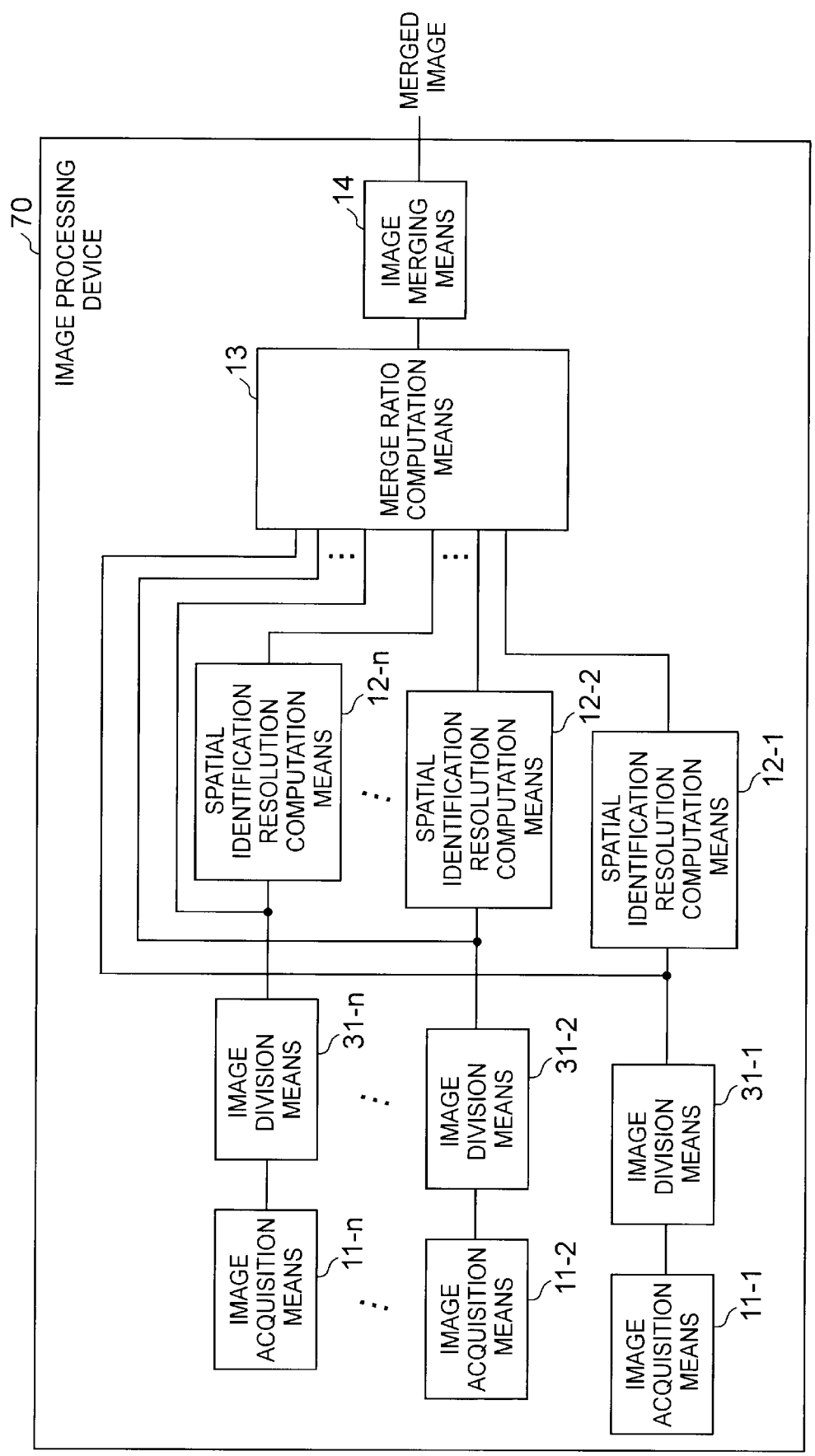
FIG. 15 is a block diagram showing a configuration example of an image processing device according to a seventh exemplary embodiment.

FIG. 15 is a block diagram showing a configuration example of an image processing device according to a seventh exemplary embodiment. In an image processing device 70 shown in FIG. 15, three or more image division means 31 (image division means 31-1 to image division means 31-*n*) are further added to the configuration according to the fifth exemplary embodiment. Note that the present exemplary embodiment indicates an example where three or more input images are used in the third exemplary embodiment. An operation according to the present exemplary embodiment is basically similar to an operation according to the third exemplary embodiment excluding the use of three or more input images.

Eighth Exemplary Embodiment

Figure 16:
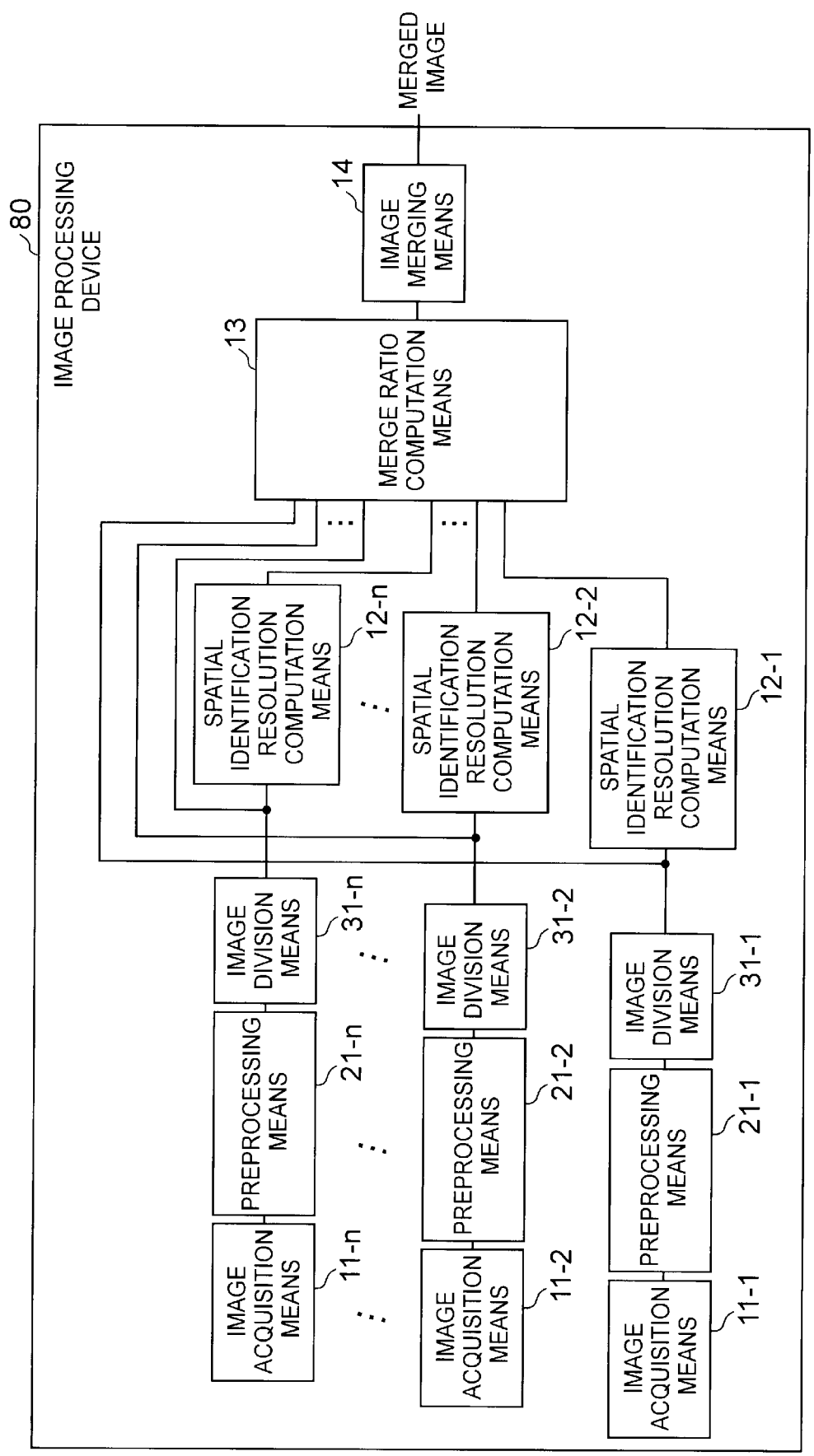
FIG. 16 is a block diagram showing a configuration example of an image processing device according to an eighth exemplary embodiment.

FIG. 16 is a block diagram showing a configuration example of an image processing device according to an eighth exemplary embodiment. An image processing device 80 shown in FIG. 16 is equivalent to an image processing device having a combination of a configuration according to the sixth exemplary embodiment and a configuration according to the seventh exemplary embodiment. Note that the present exemplary embodiment indicates an example where three or more input images are used in the fourth exemplary embodiment. An operation according to the present exemplary embodiment is basically similar to an operation according to the fourth exemplary embodiment excluding the use of three or more input images.

Example 1

Next, the operation according to the third exemplary embodiment is described by using a specific example. The present example is an example in a case where, in the configuration shown in FIG. 9 according to the third exemplary embodiment, the first image acquisition means 11 is a near infrared camera device and the second image acquisition means 11 is a far infrared camera device.

Figure 17:
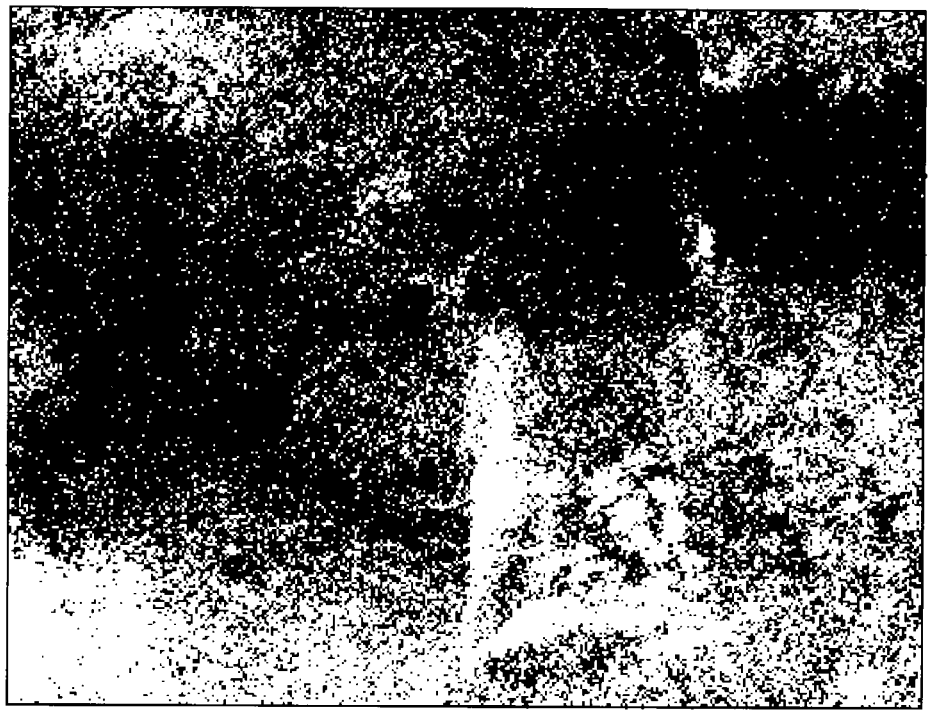
FIG. 17 is an explanatory diagram showing an example of a first image in Example 1.
Figure 18:
FIG. 18 is an explanatory diagram showing an example of a second image in Example 1.

FIG. 17 is an explanatory diagram showing an example of a first image acquired by the first image acquisition means 11, and FIG. 18 is an explanatory diagram showing an example of a second image acquired by the second image acquisition means 11. Note that the first image and the second image are originally grayscale images in which a pixel value is indicated using 256 tones, but the grayscale images have been converted into black-and-white binary images in the drawings. The pixel value may be indicated using multi-tones other than 256 tones.

In the present example, both the first image and the second image are images captured in a dark environment. In the first image, noise is generated, and visibility is low. In contrast, in the second image, a small amount of noise is generated, and a person can be easily and visually recognized. However, a contrast value is low in an area other than the person (such as an area where grass or trees are present in the back of the person or an area where grass is present in front of the person), and visibility is low, in particular, in an area around the person. Note that an image capturing area of the first image and an image capturing area of the second image completely match each other, and all of the areas in the images correspond to the first area.

Figures 19, 20, 21:
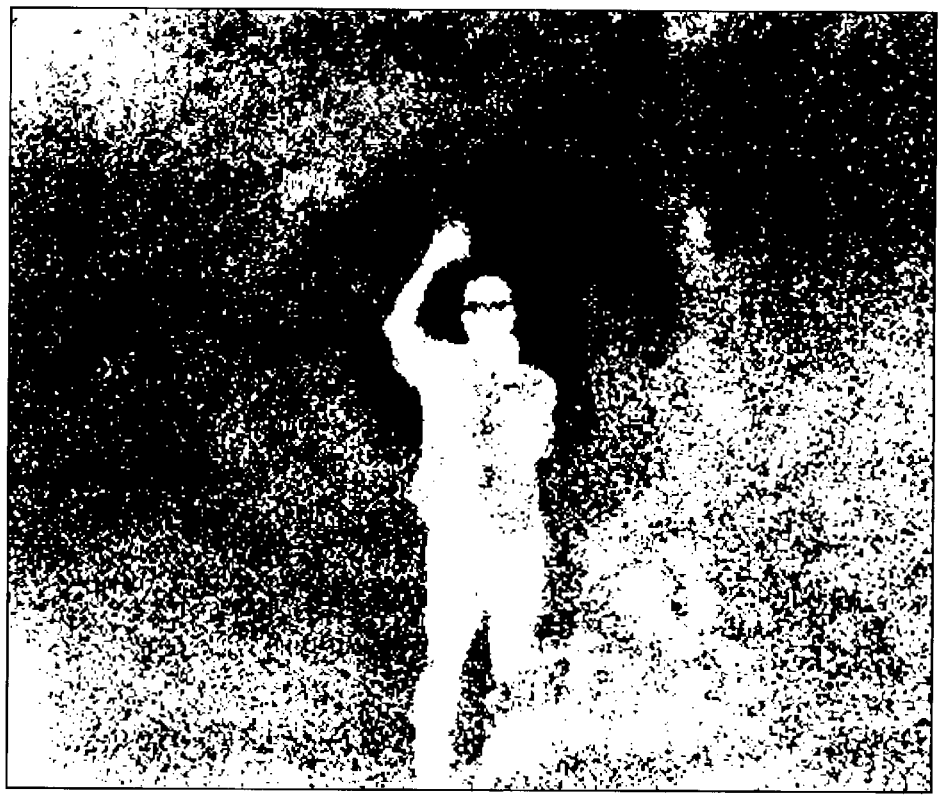
FIG. 19 is an explanatory diagram showing examples of values of each parameter that have been computed from the first image and the second image in Example 1.
FIG. 20 is an explanatory diagram showing an example of a merge ratio computed in Example 1.
FIG. 21 is an explanatory diagram showing an example of a merged image generated in Example 1.

FIG. 19 shows examples of contrast values, amounts (standard deviations) of noise, and spatial identification resolutions that have been computed from the first image and the second image in the present example. Note that the examples shown in FIG. 19 indicate values computed in an area of a left leg of a person in an image. As shown in FIG. 19, a contrast value, an amount of noise, and a spatial identification resolution that have been computed from the first image in the present example are 0.59, 50, and 3.25, respectively. In contrast, a contrast value, an amount of noise, and a spatial identification resolution that have been computed from the second image are 0.49, 6, and 3.03, respectively.

From the viewpoint of a contrast, the first image has a more excellent contrast than the second image (the first image has a greater contrast value). However, in the area of the left leg in an actual image, the leg (an object to be viewed) of the person and the other area (a background) can be more clearly identified in the second image than in the first image. Even if a finer area is used as a target, the leg of the person and the background can be identified in the second image.

According to a spatial identification resolution computed from an amount of noise and a contrast value, a finer object to be viewed can be identified in the second image.

In the present example, multiple resolution analysis is used as an image merging schemes. In this merge schemes, a first image and a second image that serve as input images are decomposed into a plurality of images including a specified spatial frequency component, each of the decomposed images is merged at a specified merge ratio, and a merged image is generated. In the present example, a merge ratio of each of the images has been determined on the basis of a spatial identification resolution serving as a visibility index. As shown in FIG. 19, a spatial identification resolution of the second image is smaller than a spatial identification resolution of the first image. It is apparent from this that a finer object to be viewed can be visually recognized in the second image than in the first image. Accordingly, a merged image having high visibility can be generated by increasing a merge ratio of a higher-frequency component of the second image.

FIG. 20 shows examples of merge ratios of the first image and the second image that have been specified for the image merging means in the present example. The examples shown in FIG. 20 are examples of merge ratios of the first image and the second image that have been computed on the basis of spatial identification resolutions of a first image and a second image included in each of four sets of images including a specified spatial frequency component in the present example.

FIG. 21 is an explanatory diagram showing a merged image generated in the present example. Note that the merged image is originally a grayscale image in which a pixel value is indicated using 256 tones, but the grayscale image has been converted into a black-and-white binary image in the drawing. It is apparent from FIG. 21 that, in a merged image in the present example that has been merged according to a merge ratio that has been computed using a spatial identification resolution based on a contrast value and an amount of noise, a person that is difficult to be visually recognized in the first image has been improved in visibility. In addition, it is apparent from FIG. 21 that, in the merged image in the present example, an area around the person that is difficult to be visually recognized in the second image has also been improved in visibility.

Figure 22:
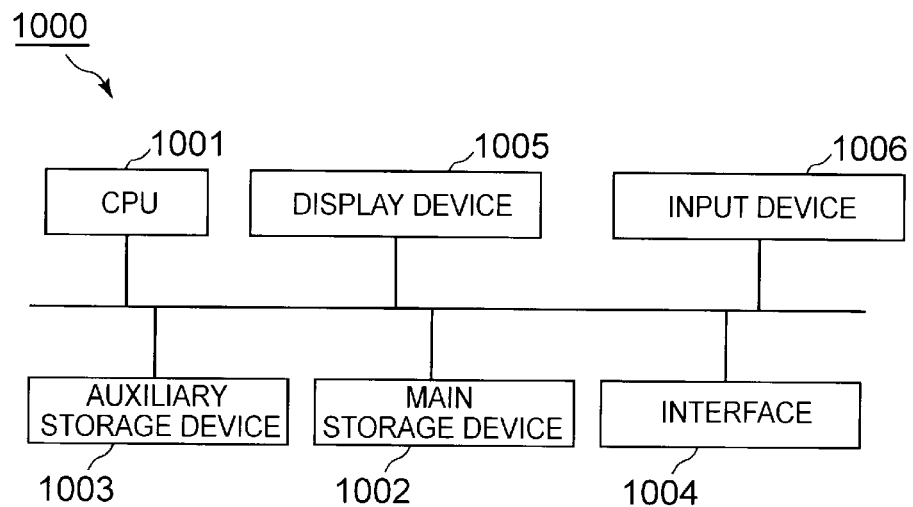
FIG. 22 is a schematic block diagram showing a configuration example of a computer according to each of the exemplary embodiments of the present invention.

In addition, FIG. 22 is a schematic block diagram showing a configuration example of a computer according to each of the exemplary embodiments of the present invention. A computer 1000 includes a CPU 1001, a main storage device 1002, an auxiliary storage device 1003, an interface 1004, a display device 1005, and an input device 1006.

The image processing devices according to the exemplary embodiments described above may be implemented by the computer 1000. In this case, an operation of each of the devices may be stored in the auxiliary storage device 1003 in the form of a program. The CPU 1001 reads a program from the auxiliary storage device 1003, develops the program in the main storage device 1002, and performs predetermined processing according to each of the exemplary embodiments, in accordance with the program. Note that the CPU 1001 is an example of an information processing device that operates according to a program, and, for example, a micro processing unit (MPU), a memory control unit (MCU), a graphics processing unit (GPU), or the like may be included rather than a central processing unit (CPU).

The auxiliary storage device 1003 is an example of a non-transitory tangible medium. Other examples of the non-transitory tangible medium include a magnetic disk, a magneto-optical disk, a CD-ROM, a DVD-ROM, a semiconductor memory, and the like that are connected via the interface 1004. In a case where this program is distributed to the computer 1000 via a communication line, a computer 1000 that has received distribution may develop the program in the main storage device 1002, and may perform predetermined processing according to each of the exemplary embodiments.

The program may be a program for implementing part of predetermined processing according to the exemplary embodiments described above. Further, the program may be a differential program for implementing the predetermined processing according to each of the exemplary embodiments in combination with another program that has already been stored in the auxiliary storage device 1003.

The interface 1004 transmits or receives information to or from another device. The display device 1005 presents information to a user. The input device 1006 receives an input of information from a user.

Depending on the content of processing according to an exemplary embodiment, some components of the computer 1000 can be omitted. For example, if the computer 1000 does not present information to a user, the display device 1005 can be omitted. For example, if the computer 1000 does not receive information from a user, the input device 1006 can be omitted.

Some or all of respective components according to the exemplary embodiments described above are implemented by general-purpose or dedicated circuitry, a processor, or the like, or a combination thereof. They may be configured by a single chip, or may be configured by a plurality of chips connected via a bus. Some or all of the respective components according to the exemplary embodiments described above may be implemented by a combination of the circuitry described above or the like and a program.

In a case where some or all of the respective components according to the exemplary embodiments described above are implemented by a plurality of information processing devices, pieces of circuitry, or the like, the plurality of information processing devices, the pieces of circuitry, or the like may be concentratedly disposed or may be distributed and disposed. For example, the information processing devices, the pieces of circuitry, or the like may be implemented in the form of connection to each other via a communication network, such as a client and server system or a cloud computing system.

Figure 23:
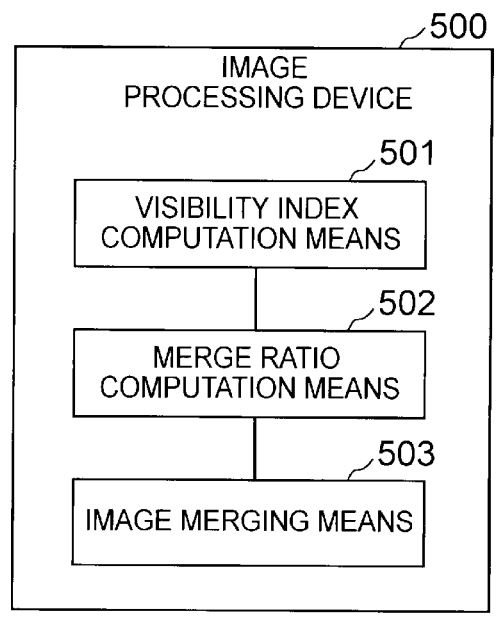
FIG. 23 is a block diagram showing an outline of an image processing device according to the present invention.

Next, an outline of the present invention is described. FIG. 23 is a block diagram showing an outline of an image processing device according to the present invention. As shown in FIG. 23, an image processing device 500 according to the present invention includes visibility index computation means 501, merge ratio computation means 502, and image merging means 503.

The visibility index computation means 501 (for example, the visibility index computation means 101 or the spatial identification resolution computation means 12-1 to 12-n), upon receiving two or more images to be merged, computes, for each image to be merged, a visibility index, which is an index relating to the visibility of an object to be viewed in the image, on the basis of a contrast value of the image and the amount of noise included in the image, wherein the two or more images to be merged have different characteristics and have at least an overlap region.

The merge ratio computation means 502 (for example, the merge ratio computation means 102 or the merge ratio computation means 13) computes an image merge ratio between the images to be merged, on the basis of the visibility indices computed by the visibility index computation means 501.

The image merging means 503 (for example, the image merging means 103 or the image merging means 14) merges the images to be merged, on the basis of the merge ratio computed by the merge ratio computation means 502, to generate a merged image.

By employing such a configuration, a merged image having high visibility can be stably generated.

The invention of the present application has been described above with reference to the exemplary embodiments and the example, but the invention of the present application is not limited to the exemplary embodiments and the example that have been described above. Various changes that those skilled in the art could understand can be made to the configuration or details of the invention of the present application without departing from the scope of the invention of the present application.

INDUSTRIAL APPLICABILITY

The present invention can be preferably applied to any purposes of merging two or more images and acquiring a new image.

REFERENCE SIGNS LIST

100 Image processing device
101 Visibility index computation means
102 Merge ratio computation means
103 Image merging means
10, 20, 30, 40, 50, 60, 70, 80 Image processing device
11 Image acquisition means
12 Spatial identification resolution computation means
121 Contrast computation means
122 Identification resolution computation means
123 Noise amount estimation means
13 Merge ratio computation means
14 Image merging means
21 Preprocessing means
31 Image division means
500 Image processing device
501 Visibility index computation means
502 Merge ratio computation means
503 Image merging means
1000 Computer
1001 CPU
1002 Main storage device
1003 Auxiliary storage device
1004 Interface
1005 Display device
1006 Input device

What is claimed is:

1. An image processing device comprising:
   a visibility index computation unit which, upon receiving two or more images to be merged, computes, for each image to be merged, a visibility index, which is an index relating to the visibility of an object to be viewed in the image, on the basis of a contrast value of the image and the amount of noise included in the image, wherein the two or more images to be merged have different characteristics and have at least an overlap region;
   a merge ratio computation unit which computes an image merge ratio between the images to be merged, on the basis of the visibility indices; and
   an image merging unit which merges the images to be merged, on the basis of the merge ratio, to generate a merged image.

2. The image processing device according to claim 1, wherein
   the visibility index is computed by using a power function using, as an input, the contrast value and the amount of noise.

3. The image processing device according to claim 1, wherein
   the visibility index is a spatial identification resolution indicating a minimum size of the object to be viewed that is identified by a predetermined visual recognizer.

4. The image processing device according to claim 1, further comprising
   an image acquisition unit which acquires each of the images to be merged.

5. The image processing devices according to claim 1, further comprising:
   a preprocessing unit which performs preprocessing on each of the images to be merged,
   wherein the visibility index computation unit, the merge ratio computation unit, and the image merging unit perform computation of the visibility indices, computation of the merge ratio, and image merging processing on an image after the preprocessing.

6. The image processing device according to claim 1, further comprising:
   a contrast value computation unit which computes the contrast value,
   wherein the contrast value computation unit computes the contrast value as a ratio of a difference between a maximum luminance value and a minimum luminance value in the input image and a sum of the maximum luminance value and the minimum luminance value.

7. The image processing device according to claim 1, further comprising:
   a noise amount estimation unit which estimates the amount of noise,
   wherein the noise amount estimation unit estimates the amount of noise, on the basis of variance of a luminance value or a measurement value that configures a pixel value in a flat area in the input image.

8. The image processing device according to claim 1, further comprising:
   an image division unit which divides an input image and outputs a plurality of division images, the image division unit being located in a pre-stage of the visibility index computation unit,
   wherein the visibility index computation unit computes the visibility indices for each of the plurality of division images,
   the merge ratio computation unit uses, as a target, each of the plurality of division images including a corresponding area between each images to be merged, and computes the merge ratio of each of the images among the plurality of division images including the corresponding area between each images to be merged, on the basis of the visibility indices, and
   the image merging unit merges the plurality of division images including the corresponding area between each images to be merged, on the basis of the merge ratio computed among the plurality of division images including the corresponding area between each images to be merged, integrates division merged images that have been obtained, and generates the merged image.

9. An image processing method performed by an information processing device, the image processing method comprising:
   upon receiving two or more images to be merged, computing, for each image to be merged, a visibility index, which is an index relating to the visibility of an object to be viewed in the image, on the basis of a contrast value of the image and the amount of noise included in the image, wherein the two or more images to be merged have different characteristics and have at least an overlap region;

computing an image merge ratio between the images to be merged, on the basis of the visibility indices; and merging the images to be merged, on the basis of the merge ratio, to generate a merged image.

10. A non-transitory computer-readable capturing medium having captured therein an image processing program for causing a computer to perform a process comprising:

upon receiving two or more images to be merged, computing, for each image to be merged, a visibility index, which is an index relating to the visibility of an object to be viewed in the image, on the basis of a contrast value of the image and the amount of noise included in the image, wherein the two or more images to be merged have different characteristics and have at least an overlap region;

computing an image merge ratio between the images to be merged, on the basis of the visibility indices; and merging the images to be merged, on the basis of the merge ratio, to generate a merged image.

11. The image processing device according to claim 2, wherein the visibility index is a spatial identification resolution indicating a minimum size of the object to be viewed that is identified by a predetermined visual recognizer.

12. The image processing device according to claim 2, further comprising an image acquisition unit which acquires each of the images to be merged.

13. The image processing device according to claim 3, further comprising an image acquisition unit which acquires each of the images to be merged.

14. The image processing device according to claim 11, further comprising an image acquisition unit which acquires each of the images to be merged.

15. The image processing devices according to claim 2, further comprising:

a preprocessing unit which performs preprocessing on each of the images to be merged, wherein the visibility index computation unit, the merge ratio computation unit, and the image merging unit perform computation of the visibility indices, computation of the merge ratio, and image merging processing on an image after the preprocessing.

16. The image processing devices according to claim 3, further comprising:

a preprocessing unit which performs preprocessing on each of the images to be merged, wherein the visibility index computation unit, the merge ratio computation unit, and the image merging unit perform computation of the visibility indices, computation of the merge ratio, and image merging processing on an image after the preprocessing.

17. The image processing devices according to claim 4, further comprising:

a preprocessing unit which performs preprocessing on each of the images to be merged, wherein the visibility index computation unit, the merge ratio computation unit, and the image merging unit perform computation of the visibility indices, computation of the merge ratio, and image merging processing on an image after the preprocessing.

18. The image processing devices according to claim 11, further comprising:

a preprocessing unit which performs preprocessing on each of the images to be merged, wherein the visibility index computation unit, the merge ratio computation unit, and the image merging unit perform computation of the visibility indices, computation of the merge ratio, and image merging processing on an image after the preprocessing.

19. The image processing devices according to claim 12, further comprising:

a preprocessing unit which performs preprocessing on each of the images to be merged, wherein the visibility index computation unit, the merge ratio computation unit, and the image merging unit perform computation of the visibility indices, computation of the merge ratio, and image merging processing on an image after the preprocessing.

20. The image processing devices according to claim 13, further comprising:

a preprocessing unit which performs preprocessing on each of the images to be merged, wherein the visibility index computation unit, the merge ratio computation unit, and the image merging unit perform computation of the visibility indices, computation of the merge ratio, and image merging processing on an image after the preprocessing.

* * * * *